United States Patent
Watarai

(10) Patent No.: US 8,320,697 B2
(45) Date of Patent: Nov. 27, 2012

(54) IMAGE PROCESSING FILTER, IMAGE PROCESSING METHOD OF IMAGE PROCESSING FILTER, AND IMAGE PROCESSING CIRCUIT OF IMAGE PROCESSING APPARATUS HAVING IMAGE PROCESSING FILTER

(75) Inventor: Yuji Watarai, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 896 days.

(21) Appl. No.: 12/189,882

(22) Filed: Aug. 12, 2008

(65) Prior Publication Data

US 2009/0087116 A1     Apr. 2, 2009

(30) Foreign Application Priority Data

Sep. 28, 2007   (JP) ................. 2007-254542

(51) Int. Cl.
*G06K 9/40* (2006.01)
*G06T 5/20* (2006.01)

(52) U.S. Cl. ..................................... 382/261

(58) Field of Classification Search ............... 382/260, 382/261; 348/610
See application file for complete search history.

(56) References Cited

U.S. PATENT DOCUMENTS

| | | | |
|---|---|---|---|
| 4,761,819 A * | 8/1988 | Denison et al. | ............... 382/261 |
| 4,794,531 A | 12/1988 | Morishita et al. | |
| 5,134,503 A | 7/1992 | Kimura | |
| 6,016,164 A * | 1/2000 | Kawaguchi et al. | ..... 375/240.24 |
| 6,757,014 B1 | 6/2004 | Kasahara | |
| 7,116,837 B2 | 10/2006 | Nakajima et al. | |

FOREIGN PATENT DOCUMENTS

| | | |
|---|---|---|
| JP | 60-236580 A | 11/1985 |
| JP | 61-112286 A | 5/1986 |
| JP | 03-054679 A | 3/1991 |
| JP | 09-083804 A | 3/1997 |
| JP | 10-210298 | 8/1998 |
| JP | 2000-106630 A | 4/2000 |
| JP | 2001-005958 A | 1/2001 |
| JP | 2002-259965 A | 9/2002 |
| JP | 2004-150280 A | 5/2004 |
| WO | WO 2007/043460 A | 4/2007 |

OTHER PUBLICATIONS

Rey et al. "A Parameterized Family of Nonlinear Image Smoothing Filters." IEEE Transactions on Acoustics, Speech and Signal Processing, vol. 37, No. 9, Sep. 1989, pp. 1458-1462.*

* cited by examiner

*Primary Examiner* — Jon Chang
(74) *Attorney, Agent, or Firm* — Arent Fox LLP

(57) ABSTRACT

An image processing filter for correcting a pixel value of an image includes a flatness calculation unit 40 for calculating a flatness of distribution of pixel values of surrounding pixels positioned on the periphery of a target pixel to be filtered, and a pixel value composition unit 50 for blending the pixel value of the target pixel and the pixel value of the surrounding pixels, on the basis of a blend ratio corresponding to the flatness calculated by the flatness calculation unit 40, and generating a composite pixel value by combining the pixel value of the target pixel and the pixel value of the surrounding pixels.

16 Claims, 15 Drawing Sheets

SCHEMATIC DIAGRAM OF IMAGE PROCESSING APPARATUS OF FIRST EMBODIMENT

FIG. 1 SCHEMATIC DIAGRAM OF DIGITAL CAMERA PROVIDED WITH IMAGE PROCESSING APPARATUS OF FIRST EMBODIMENT

SCHEMATIC DIAGRAM OF εFILTER

EXPLANATORY DIAGRAM OF EXTRACTED REGION
IN DIGITAL IMAGE USED FOR FIRST EMBODIMENT

FIG. 8 GRAPH SHOWING CHANGE OF AVERAGE DEVIATION OF SUBJECT IMAGE PIXEL VALUE DISTRIBUTION TO SUBJECT IMAGE PIXEL VALUE

FIG. 9 SCHEMATIC DIAGRAM OF PIXEL VALUE DISTRIBUTION IDENTIFICATION CIRCUIT PROVIDED FOR IMAGE PROCESSING APPARATUS OF SECOND EMBODIMENT

SCHEMATIC DIAGRAM OF PIXEL VALUE DISTRIBUTION
CORRECTION CIRCUIT OF ANOTHER EMBODIMENT

PIXEL VALUE DISTRIBUTION CHART SHOWING NOISE INCORPORATION IN TARGET PIXEL

PIXEL VALUE DISTRIBUTION CHART SHOWING EXISTENCE
OF TARGET PIXEL NEAR IMAGE BOUNDARY

IMAGE PROCESSING FILTER, IMAGE PROCESSING METHOD OF IMAGE PROCESSING FILTER, AND IMAGE PROCESSING CIRCUIT OF IMAGE PROCESSING APPARATUS HAVING IMAGE PROCESSING FILTER

CROSS-REFERENCE TO RELATED APPLICATIONS

This application is based upon and claims the benefit of priority from the prior Japanese Patent Application No. 2007-254542 filed on Sep. 28, 2007, the entire contents of which are incorporated herein by reference.

BACKGROUND

1. Field

The present disclosure relates to an image processing filter, an image processing method of the image processing filter, and an image processing circuit of an image processing apparatus having the image processing filter.

2. Description of Related Art

In an image processing apparatus, for example, an image is read by an image sensor, and is averaged, so that the picture quality of the image is improved. In the image processing apparatus disclosed in Japanese Patent Publication No. 60-236580, the image being read by the image sensor is processed by a space filter to sharpen or smoothen the image, and thereby the image is improved.

In the image processing apparatus disclosed in Japanese Patent Publication No. 03-54679, an image signal obtained from a continuous gradation image is averaged according to the concentration and contrast data of the image signal, and noise is favorably reduced from the image signal.

In a recent digital camera, since the photo detection capability of an image pickup device has been improved, it is easier to detect random noise, as well as the light from the subject, and an S/N ratio is lowered. Accordingly, in the recent digital camera, it is demanded to lower random noise and enhance the S/N ratio without lowering the picture quality of the taken image.

Generally, the image processing apparatus for reducing random noise and improving the S/N ratio includes the space filter having weight table, a median filter, or an ε filter. The ε filter is characterized in that it sets the noise judging value ε in a specific range, and eliminates random noise of small amplification given to the signal while maintaining the abrupt large amplification change component of the signal.

In the image processing apparatus using the ε filter, if a relatively large noise is mixed into the target pixel, as shown in FIG. 14, the differential value between the pixel value of target pixel and the pixel value of surrounding pixel may exceed the noise judging value ε. In the image processing apparatus using the ε filter, in the case shown in FIG. 14, although noise is mixed into the true value of a target pixel, the pixel value containing the noise may be used when calculating the pixel value of the target pixel. Accordingly, in the image processing apparatus using the ε filter, due to the effect of the pixel value containing the noise, the pixel value of the target pixel may be prevented from approaching the true value of the target pixel.

Further, in the image processing apparatus using the ε filter, as shown in FIG. 15, the pixel value of target pixel may be present in the boundary (image boundary) of an image region of a specific color or an image region of other than specific color. In the image processing apparatus using the ε filter, if the pixel value of the target pixel is present near the image boundary, when calculating the pixel value of target pixel, for example, if an average value of two adjacent pixel values across the image boundary (an average pixel value) is used, the average pixel value may be closer to the pixel value adjacent to the average pixel value. Accordingly, in the image processing apparatus using the ε filter, when the average pixel value approaches the pixel value adjacent to the average pixel value, it is impossible to recognize the existence of the image boundary between the average pixel value and the pixel value adjacent to the average pixel value. As a result, in the image processing apparatus using the ε filter, the pixel value cannot be changed suddenly across the image boundary. Therefore, the image contrast gets lowered, and the image excellent in sharpness may not be obtained.

SUMMARY

The present disclosure is proposed in the light of the above circumstances, and it is hence an object thereof to provide an image processing filter capable of bringing the pixel value of a target pixel closer to the true value of the target pixel, and obtaining an image excellent in sharpness, an image processing method of the image processing filter, and an image processing circuit of an image processing apparatus having the same image processing filter.

The above and further novel features of the disclosure will more fully appear from the following detailed description when the same is read in connection with the accompanying drawings. It is to be expressly understood, however, that the drawings are for the purpose of illustration only and are not intended as a definition of the limits of the disclosure.

DETAILED DESCRIPTION OF THE PREFERRED EMBODIMENTS

Figure 1:
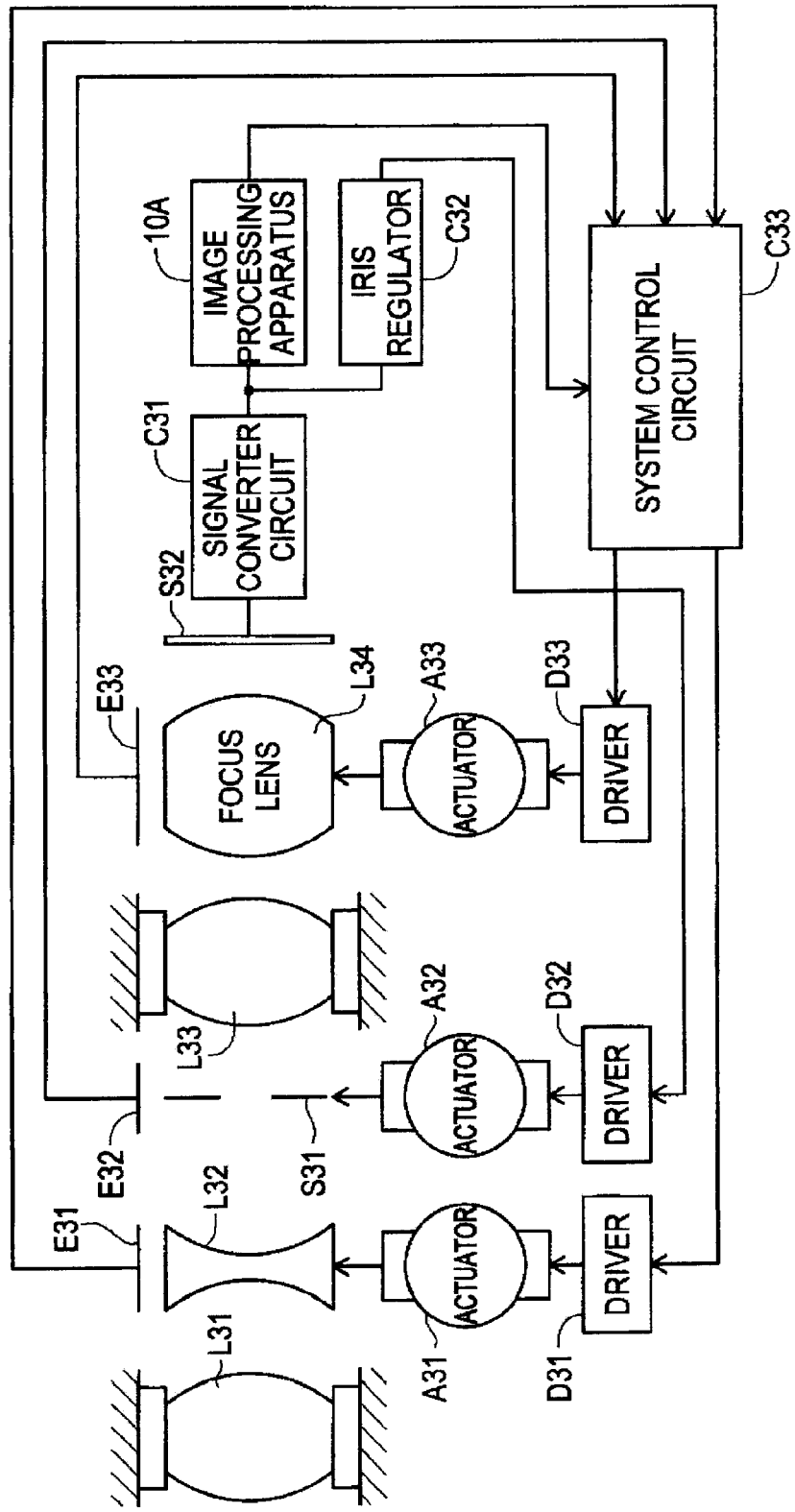
FIG. 1 is a schematic diagram of a digital camera provided with an image processing apparatus of the first embodiment.

According to the image processing filter as set forth in the disclosure, on the basis of a blend ratio corresponding to the flatness calculated by a flatness calculation unit, a pixel value of the target pixel and the pixel value of the surrounding pixel positioned on the periphery of the target pixel are blended into a pixel value composition unit, and a composite pixel value is produced from the pixel value of the target pixel and the pixel value of the surrounding pixel. Hence, in the image processing filter as set forth in the disclosure, since the composite pixel value is produced on the basis of the blend ratio corresponding to the flatness of distribution of the pixel values of surrounding pixels, when generating the composite pixel value, the composite pixel value can be changed according to the distribution state of the pixel values of the surrounding pixels. In the image processing filter as set forth in the disclosure, therefore, when the composite pixel value is changed according to the distribution state of the pixel values of the surrounding pixels, if the pixel values of surrounding pixels change suddenly across the image boundary, the composite pixel value can be produced according to the change of the pixel values of the surrounding pixels. Therefore, in the image processing filter as set forth in the disclosure, if the pixel values of surrounding pixels positioned on the periphery of target pixel change suddenly across the image boundary, by lowering the ratio of the pixel values of the surrounding pixels to be blended to the composite pixel value corresponding to the flatness, the ratio of blending pixel values largely different from the pixel value of the target pixel (pixel values of the surrounding pixels) to the composite pixel value can be decreased, and the composite pixel value may be brought closer to the true value of the pixel value of the target pixel.

Further, according to the image processing filter as set forth in the disclosure, if the pixel values of the surrounding pixels positioned on the periphery of the target pixel change suddenly across the image boundary, the composite pixel value can be produced according to changes of pixel values of the surrounding pixels, and hence the height of the image contrast can be adjusted according to the composite pixel value, so that an image excellent in sharpness can be obtained.

According to the image processing circuit of the image processing apparatus as set forth in the disclosure, on the basis of the blend ratio corresponding to the flatness calculated by a flatness calculation unit, the pixel value of the target pixel and the pixel value of the surrounding pixel positioned on the periphery of the target pixel are blended into a pixel value composition unit, and a composite pixel value is produced from the pixel value of the target pixel and the pixel value of the surrounding pixel. Hence, in the image processing circuit of the image processing apparatus as set forth in the disclosure, since the composite pixel value is produced on the basis of the blend ratio corresponding to the flatness of the distribution of pixel values of the surrounding pixels, when generating the composite pixel value, the composite pixel value can be changed according to the distribution state of pixel values of the surrounding pixels. In the image processing circuit of the image processing apparatus as set forth in the disclosure, therefore, when the composite pixel value is changed according to the distribution state of the pixel values of the surrounding pixels, if the pixel values of the surrounding pixels change suddenly across the image boundary, the composite pixel value can be produced according to the change of pixel values of the surrounding pixels. Therefore, in the image processing circuit of the image processing apparatus as set forth in the disclosure, if the pixel values of surrounding pixels positioned on the periphery of the target pixel change suddenly across the image boundary, by lowering the ratio of pixel values of the surrounding pixels to be blended to the composite pixel value corresponding to the flatness, the ratio of the blending pixel values largely different from the pixel value of the target pixel (pixel values of the surrounding pixels) to the composite pixel value can be decreased, and the composite pixel value may be brought closer to the true value of the pixel value of the target pixel.

Further, according to the image processing circuit of the image processing apparatus as set forth in the disclosure, if the pixel values of the surrounding pixels positioned on the periphery of the target pixel change suddenly across the image boundary, the composite pixel value can be produced according to changes of pixel values of the surrounding pixels, and hence the height of the image contrast can be adjusted according to the composite pixel value, so that an image excellent in sharpness can be obtained.

According to the image processing method of the image processing filter as set forth in the disclosure, on the basis of the blend ratio corresponding to the flatness calculated at a flatness calculation step, the pixel value of the target pixel and the pixel value of the surrounding pixel positioned on the periphery of the target pixel are blended at a pixel value composition step, and a composite pixel value is produced from the pixel value of the target pixel and the pixel value of the surrounding pixel. Hence, in the image processing method of the image processing filter as set forth in the disclosure, since the composite pixel value is produced on the basis of the blend ratio corresponding to the flatness of the distribution of pixel values of the surrounding pixels, when generating the composite pixel value, the composite pixel value can be changed according to the distribution state of the pixel values of the surrounding pixels. In the image processing method of the image processing filter as set forth in the disclosure, therefore, when the composite pixel value is changed according to the distribution state of the pixel values of the surrounding pixels, if the pixel values of the surrounding pixels change suddenly across the image boundary, the composite pixel value can be produced according to the change of pixel values of the surrounding pixels. Therefore, in the image processing method of the image processing filter as set forth in the disclosure, if the pixel values of the surrounding pixels positioned on the periphery of the target pixel change suddenly across the image boundary, by lowering the ratio of pixel values of the surrounding pixels to be blended to the composite pixel value corresponding to the flatness, the ratio of the blending pixel values largely different from the pixel value of the target pixel (pixel values of surrounding pixels) to the composite pixel value can be decreased, and the composite pixel value may be brought closer to the true value of the pixel value of the target pixel.

Further, according to the image processing method of the image processing filter as set forth in the disclosure, if the pixel values of the surrounding pixels positioned on the periphery of the target pixel change suddenly across the image boundary, the composite pixel value can be produced according to changes of pixel values of the surrounding pixels, and hence the height of the image contrast can be adjusted according to the composite pixel value, so that an image excellent in sharpness can be obtained.

First Embodiment

A first embodiment of the disclosure is described below with reference to FIG. 1 to FIG. 8. This is an explanation of an image processing apparatus 10A having an image processing filter of the disclosure, and an image processing circuit of the image processing apparatus having the image processing filter, being mounted on a digital camera 1. FIG. 1 is a block diagram of the digital camera 1. The digital camera 1 includes a first fixed lens group L31, a zoom lens L32, an iris 531, a second fixed lens group L33, a focus lens L34, and an image sensor S32.

The digital camera 1 further includes actuators A31 to A33, drivers D31 to D33, a zoom encoder E31, an iris encoder E32, and a focus encoder E33.

In addition, the digital camera 1 is also provided with a signal converter circuit C31, an image processing apparatus 10A, an iris regulator C32, and a system control circuit C33. An input terminal of an image processing apparatus 10A is connected to the image sensor S32 by way of the signal converter circuit C31. An output terminal of the image processing apparatus 10A is connected to a first input terminal of the system control circuit C33. The system control circuit C33 has an image generation circuit. The first input terminal of the system control circuit C33 is connected to the image generation circuit. The image generation circuit corresponds to an image generation unit.

Figure 2:
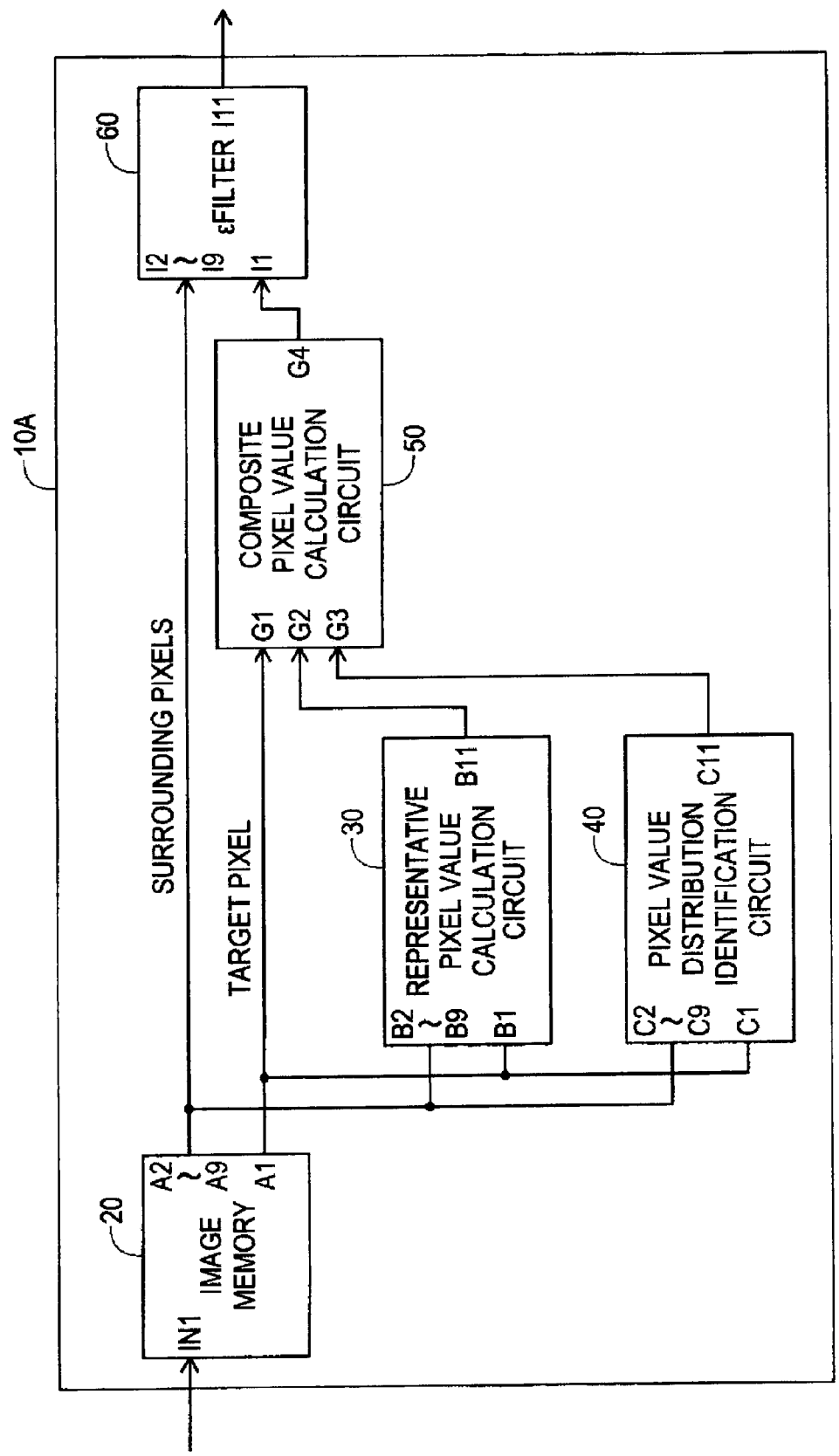
FIG. 2 is a schematic diagram of an image processing apparatus of the first embodiment.

FIG. 2 is a block diagram showing the configuration of the image processing apparatus 10A of the first embodiment. The image processing apparatus 10A has, as shown in the drawing, an image memory 20, a representative pixel value calculation circuit 30, a pixel value distribution identification circuit 40, a composite pixel value calculation circuit 50, and an ϵ filter 60.

The image memory 20 is composed of an SRAM and an FF. An input terminal IN1 of the image memory 20 is connected to the input terminal of the image processing apparatus 10A.

A target pixel value input terminal B1 of a representative pixel value calculation circuit 30 is connected to a target pixel value output terminal A1 of the image memory 20. Peripheral pixel value input terminals B2 to B9 of the representative pixel value calculation circuit 30 are connected to peripheral pixel value output terminals A2 to A9 of the image memory 20.

A target pixel value input terminal C1 of a pixel value distribution identification circuit 40 is connected to a target pixel value output terminal A1 of the image memory 20. Surrounding pixel value input terminals C2 to C9 of the pixel value distribution identification circuit 40 connected to surrounding pixel value output terminals A2 to A9 of the image memory 20.

Figure 3:
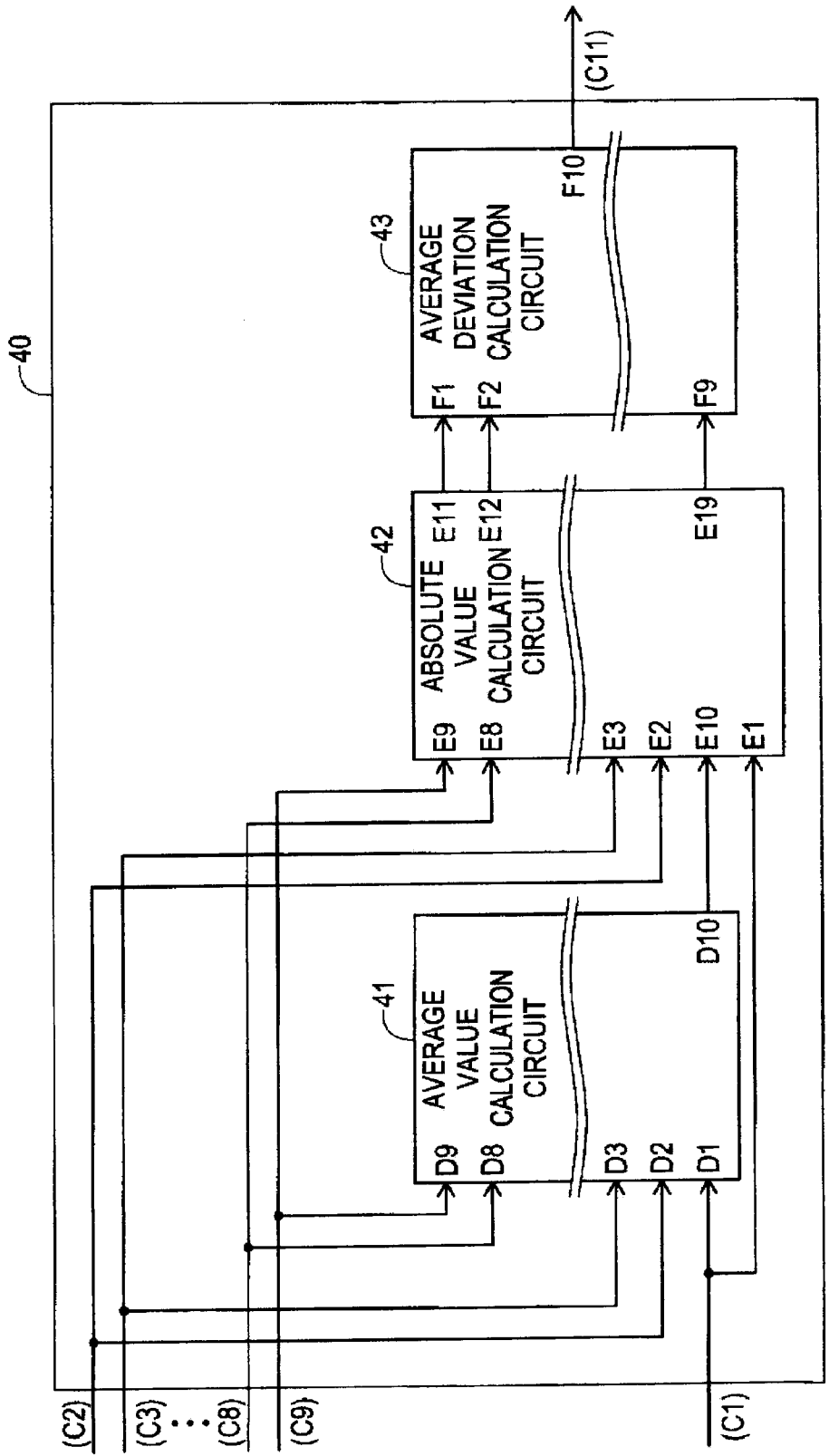
FIG. 3 is a schematic diagram of a pixel value distribution identification circuit.

The pixel value distribution identification circuit 40 is, as shown in FIG. 3, provided with an average value calculation circuit 41, an absolute value calculation circuit 42, and an average deviation calculation circuit 43. A target pixel value input terminal D1 of the average value calculation circuit 41 is connected to a target pixel value input terminal C1 of the pixel value distribution identification circuit 40.

A surrounding pixel value input terminal D2 of the average value calculation circuit 41 is connected to the surrounding pixel value input terminal C2. Surrounding pixel value input terminals D3 to D9 of the average value calculation circuit 41 are connected to surrounding pixel value input terminals C3 to C9 of the pixel value distribution identification circuit 40. Surrounding pixel value input terminals D4 to D7 are not shown in the drawing.

A target pixel value input terminal E1 of an absolute value calculation circuit 42 is connected to the target pixel value input terminal C1 of the pixel value distribution identification circuit 40. A surrounding pixel value input terminal E2 of the absolute value calculation circuit 42 is connected to the surrounding pixel value input terminal C2 of the pixel value distribution identification circuit 40. Surrounding pixel value input terminals E3 to E9 of the absolute value calculation circuit 42 are connected to the surrounding pixel value input terminals C3 to C9 of the pixel value distribution identification circuit 40. An average value input terminal E10 of the absolute value calculation circuit 42 is connected to the average value output terminal D10 of the average value calculation circuit 41. Surrounding pixel value input terminals C4 to C7 and surrounding pixel value input terminals E4 to E7 are not shown in the drawing.

An input terminal F1 of an average deviation calculation circuit 43 is connected to an absolute value output terminal E11 of the absolute value calculation circuit 42. Input terminals F2 to F9 of the average deviation calculation circuit 43 are connected to absolute value output terminals E12 to E19 of the absolute value calculation circuit 42. Absolute value output terminals E13 to E18 and input terminals F3 to F8 are not shown in the drawing. An output terminal F10 of the average deviation calculation circuit 43 is connected to the output terminal C11 of the pixel value distribution identification circuit 40.

A target pixel value input terminal G1 of a composite pixel value calculation circuit 50 is connected to a target pixel value output terminal A1 of the image memory 20. A representative pixel value input terminal G2 of the composite pixel value calculation circuit 50 is connected to an output terminal B11 of the representative pixel value calculation circuit 30. A pixel value distribution identification information input terminal G3 of the composite pixel value calculation circuit 50 is connected to an output terminal C11 of the pixel value distribution identification circuit 40.

Figure 4:
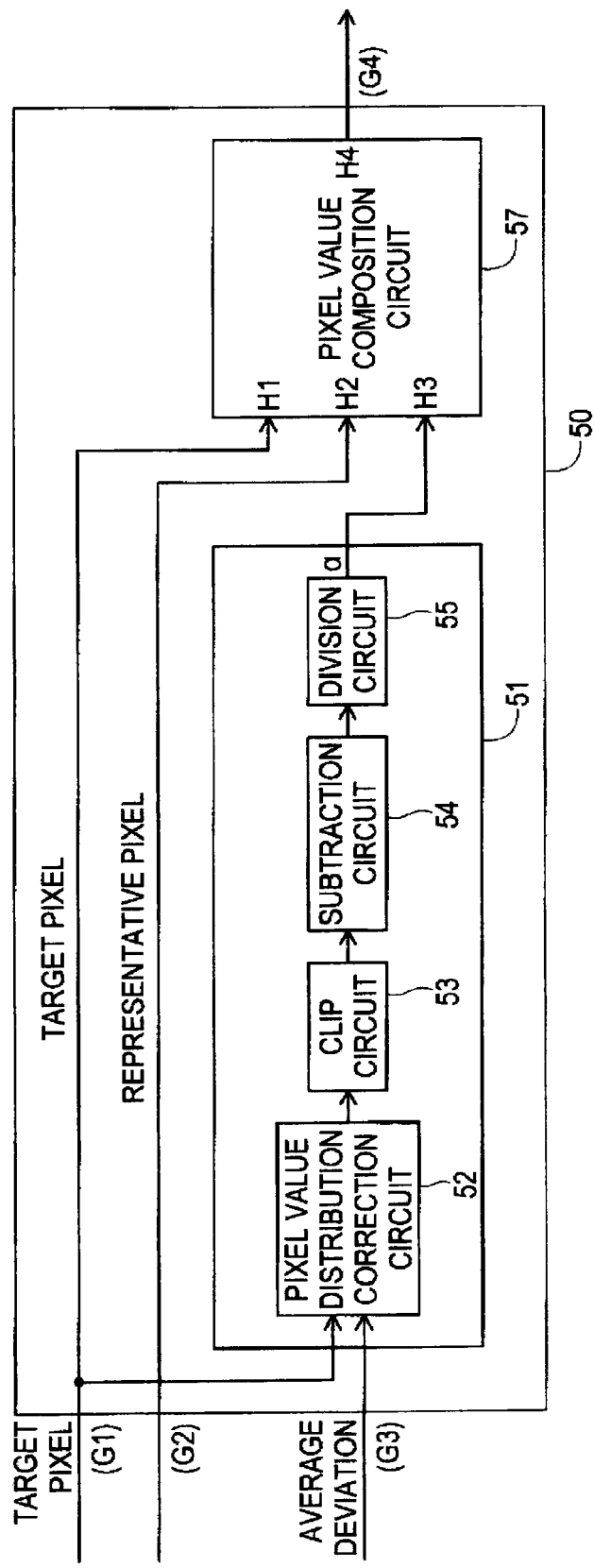
FIG. 4 is a schematic diagram of a composite pixel value calculation circuit.

The composite pixel value calculation circuit 50 includes, as shown in FIG. 4, a normalizing circuit 51 and a pixel value composition circuit 57. The normalizing circuit 51 has a pixel value distribution correction circuit 52, a clip circuit 53, a subtraction circuit 54, and a division circuit 55.

A first input terminal of the pixel value distribution correction circuit 52 is connected to a target pixel value input terminal G1 of the composite pixel value calculation circuit 50. A second input terminal of the pixel value distribution correction circuit 52 is connected to a pixel value distribution identification input terminal G3 of the composite pixel value calculation circuit 50. An output terminal of the pixel value distribution correction circuit 52 is connected to an input terminal of the clip circuit 53. An output terminal of the clip circuit 53 is connected to an input terminal of the subtraction circuit 54. An output terminal of the subtraction circuit 54 is connected to an input terminal of the division circuit 55. The pixel value distribution correction circuit 52 has a look-up table memory.

A first input terminal H1 of a pixel value composition circuit 57 is connected to a target pixel value input terminal G1 of the composite pixel value calculation circuit 50. A second input terminal H2 of the pixel value composition circuit 57 is connected to a representative pixel value input terminal G2 of the composite pixel value calculation circuit 50. A third input terminal H3 of the pixel value composition circuit 57 is connected to an output terminal of the division circuit 55. An output terminal H4 of the pixel value composition circuit 57 is connected to an output terminal G4 of the composite pixel value calculation circuit 50.

A composite pixel value input terminal I1 of the ϵ filter 60 is connected to an output terminal G4 of the composite pixel value calculation circuit 50. Surrounding pixel value input terminals I2 to I9 of the ε filter 60 are respectively connected to surrounding pixel value output terminals A2 to A9 of the image memory 20.

Figure 5:
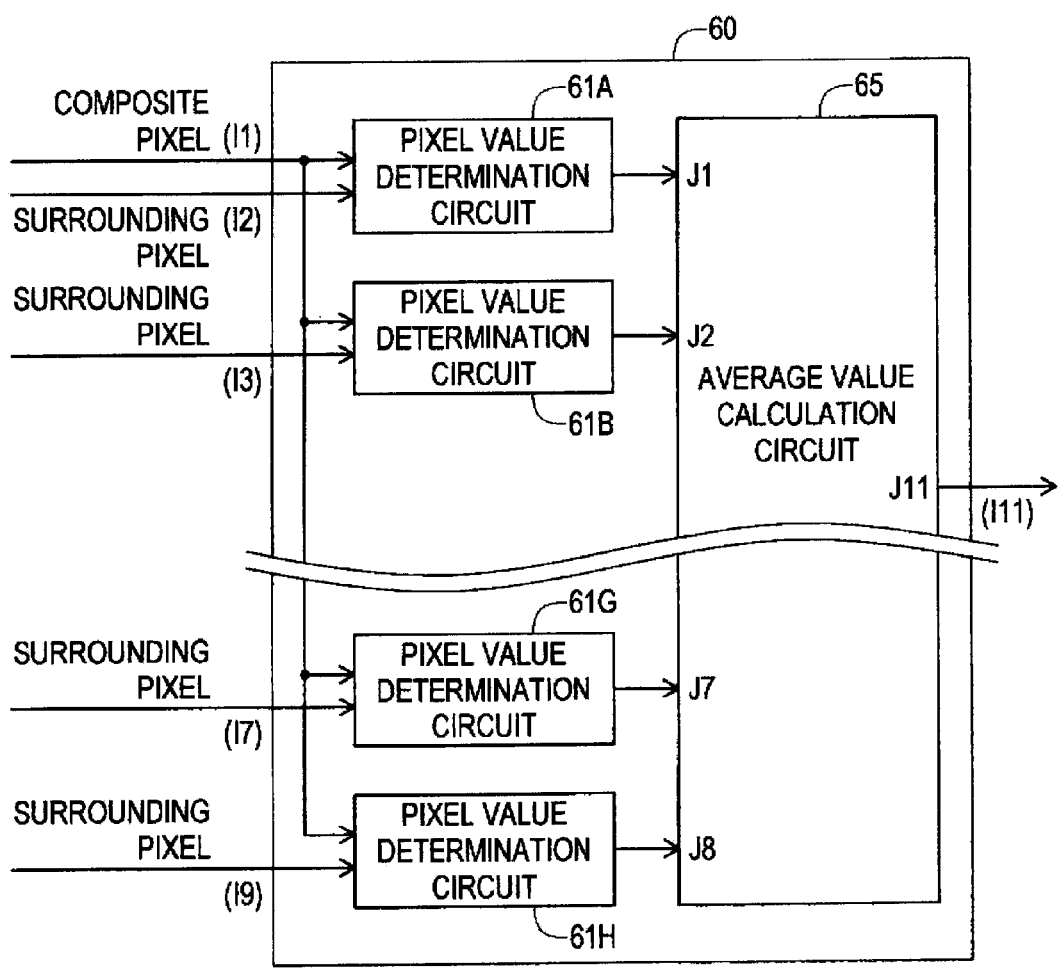
FIG. 5 is a schematic diagram of a ε filter.

As shown in FIG. 5, the ε filter 60 is provided with pixel value determination circuits 61A to 61H, and an average value calculation circuit 65. A first input terminal of a pixel value determination circuit 61A is connected to the composite pixel value input terminal I1 of the ε filter 60. A second input terminal of the pixel value determination circuit 61A is connected to the composite pixel value input terminal I2 of the ε filter 60.

First input terminals of pixel value determination circuits 61B to 61H are connected to the composite pixel value input terminal I1. Second input terminals of the pixel value determination circuits 61B to 61H are respectively connected to the surrounding pixel value input terminals I2 to I9. Surrounding pixel value input terminals I4 to I6 of the ε filter 60 are not shown.

Figure 6:
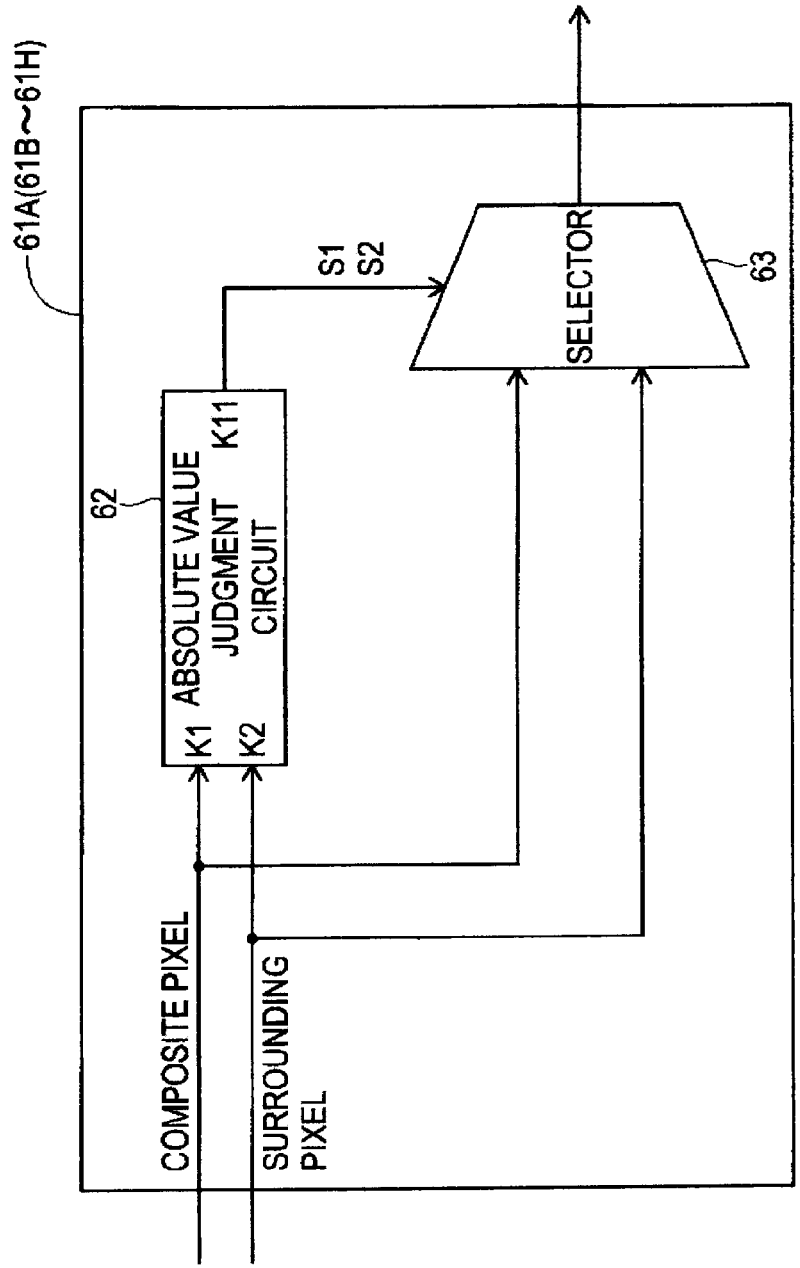
FIG. 6 is a schematic diagram of a pixel value determining circuit.

The pixel value determination circuit 61A is provided with, as shown in FIG. 6, an absolute value judgment circuit 62 and a selector 63. A composite pixel value input terminal K1 of the absolute value judgment circuit 62 is connected to a first input terminal of the pixel value determination circuit 61A. A surrounding pixel value input terminal K2 of the absolute value judgment circuit 62 is connected to a second input terminal of the pixel value determination circuit 61A.

A first input of the selector 63 is connected to a first input terminal of the pixel value determination circuit 61A. A second input of the selector 63 is connected to a second input terminal of the pixel value determination circuit 61A. An output of the selector 63 is connected to an output terminal of the pixel value determination circuit 61A. A select signal input of the selector 63 is connected to an output terminal K11 of the absolute value judgment circuit 62.

The pixel value determination circuits 61B to 61H, same as the pixel value determination circuit 61A, are individually provided with an absolute value judgment circuit 62 and a selector 63. In the pixel value determination circuits 61B to 61H, a composite pixel value input terminal K1 of each absolute value judgment circuit 62 is connected to a first input terminal of each of the pixel value determination circuits 61B to 61H. In the pixel value determination circuits 61B to 61H, a surrounding pixel value input terminal K2 of each absolute value judgment circuit 62 is connected to a second input terminal of each one of the pixel value determination circuits 61B to 61H. In the pixel value determination circuits 61B to 61H, an output of each selector 63 is connected to each output terminal of the pixel value determination circuits 61B to 61H.

An input terminal J1 of the average value calculation circuit 65 is connected to an output terminal of the pixel value determination circuit 61A. Input terminals J2 to J8 of the average value calculation circuit 65 are connected to output terminals of the pixel value determination circuits 61B to 61H, respectively. An output terminal J11 of the average value calculation circuit 65 is connected to an output terminal I11 of the ε filter 60. Input terminals J3 to J6 of the average value calculation circuit 65 are not shown in the drawing.

The image processing method of the image processing apparatus 10A of the first embodiment is explained below. As understood from FIG. 1 and FIG. 2, an output of the signal converter circuit C31 for processing the signal of the image sensor S32 is connected to an input terminal IN1 of the image memory 20. A digital signal is supplied to the image memory 20 by way of the input terminal IN1.

The image memory 20 stores line data of luminance portion generated by the signal converter circuit C31. In the embodiment, the image memory 20 stores data of two lines. The line data is composed of a plurality of pixel values. The image memory 20 stores data of digital image of the subject in every line data.

Figure 7:
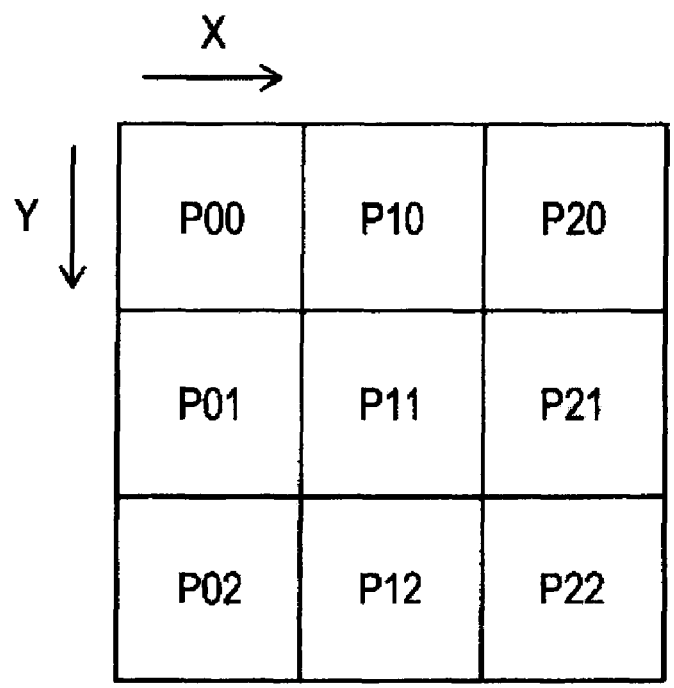
FIG. 7 is an explanatory diagram of an extracted region in a digital image used for the first embodiment.

In the image processing apparatus 10A of the embodiment, as shown in FIG. 7, the image memory 20 extracts a 3×3 region of 3 pixels each individually in the X-direction and Y-direction from the data of the digital image stored in the image memory 20. In the diagram, P11 indicates target pixel value data, and other codes P00 to P22 than P11 indicate surrounding pixel value data.

In the image processing apparatus 10A, the image memory 20 is controlled by the CPU, and the target pixel value output terminal A1 outputs the target pixel value data P11 to the representative pixel value calculation circuit 30, the pixel value distribution identification circuit 40, and the composite pixel value calculation circuit 50, respectively. In addition, the image memory 20 is controlled by the CPU, and outputs surrounding pixel value data P00 to P22 (except P11) from the surrounding pixel value output terminals A2 to A9, to the representative pixel value calculation circuit 30, the pixel value distribution identification circuit 40, and the ε filter 60, respectively.

The representative pixel value calculation circuit 30 receives target pixel value data P11 through the target pixel value input terminal B1. In addition, the representative pixel value calculation circuit 30 also receives surrounding pixel value data P00 to P22 (except P11) through surrounding pixel value input terminals B2 to B9.

In the embodiment, the representative pixel value calculation circuit 30 first extracts four surrounding pixel value data P01, 10, P21, P12 from all pixel value data. The surrounding pixel value data P01, 10, P21, P12 are pixel value data of pixels adjacent to the target pixel, in X direction and Y direction of the 3×3 region.

Next, the representative pixel value calculation circuit 30 sums up the values of surrounding pixel value data P01, 10, P21, P12. The representative pixel value calculation circuit 30 subtracts the maximum value and the minimum value of the four surrounding pixel value data from the summed result. Successively, the representative pixel value calculation circuit 30 calculates the average of the subtraction results. The average of the subtraction results is calculated in order to reduce the noise mixing in the digital image. The representative pixel value calculation circuit 30 outputs the average from the output terminal B11 to the representative pixel value input terminal G2 of the composite pixel value calculation circuit 50. In the embodiment, the average corresponds to the representative pixel value.

The pixel value distribution identification circuit 40 receives target pixel value data P11 by way of the target pixel value input terminal C1. In addition, the pixel value distribution identification circuit 40 receives surrounding pixel value data P00 to P22 (except P11) through the surrounding the pixel value input terminals C2 to C9.

As understood from FIG. 3, the average value calculation circuit 41 receives target pixel value data P11 through the target pixel value input terminal D1. In addition, the average value calculation circuit 41 also receives surrounding pixel value data P11 to P22 (except P11) through the surrounding pixel value input terminals D2 to D9. The average value calculation circuit 41 calculates the average of all pixel value data entered in the average value calculation circuit 41. The average value calculation circuit 41 outputs the calculated average from the average value output terminal D10.

The absolute value calculation circuit 42 receives average value data of all pixel value data in the 3×3 region through the average value input terminal E10. In addition, the absolute value calculation circuit 42 also receives target pixel value data P11 through the target pixel value input terminal E1. The absolute value calculation circuit 42 further receives surrounding pixel value data P00 to P22 (except P11) through surrounding pixel value input terminal E2 to E9. The absolute value calculation circuit 42 subtracts the average calculated by the average value calculation circuit 41 from the value of target pixel value data P11, and calculates the absolute value of the result. The absolute value calculation circuit 42 outputs the calculated absolute value from the absolute value output terminal E11 to the input terminal F1 of the average deviation calculation circuit 43.

The absolute value calculation circuit 42 subtracts the average calculated by the average value calculation circuit 41 from the value of the surrounding pixel value data P00, and calculates the absolute value of the result. The absolute value calculation circuit 42 outputs the calculated absolute value from the absolute value output terminal E12 to the input terminal F2 of the average deviation calculation circuit 43.

The absolute value calculation circuit 42 subtracts the average calculated by the average value calculation circuit 41 from the value of surrounding pixel value data P01 to P22 (except P11), and calculates the absolute value of the result. The absolute value calculation circuit 42 outputs the calculated absolute value from the absolute value output terminals E13 to E19 to the input terminals F3 to F9 of the average deviation calculation circuit 43.

As mentioned above, the average deviation calculation circuit 43 receives the absolute value of the subtracted result of the average value calculated by the average value calculation circuit 41 from the value of target pixel value data P11. The average deviation calculation circuit 43 also receives the absolute value of the subtracted result of the average value calculated by the average value calculation circuit 41 from the value of surrounding pixel value data P00 to P22 (except P11). The average deviation calculation circuit 43 first sums up all absolute values entered in the input terminals F1 to F9. The average deviation calculation circuit 43, successively, averages the sum of the absolute values, and calculates the average deviation. The average deviation calculation circuit 43 then outputs the data of the calculated average deviation from the output terminal F10. The data of the average deviation is output from the output terminal C11 of the pixel value distribution identification circuit 40. The average deviation corresponds to the flatness.

The composite pixel value calculation circuit 50 receives target pixel value data P11 through the target pixel value input terminal G1. In addition, the composite pixel value calculation circuit 50 receives data of the average value calculated by the representative pixel value calculation circuit 30 through the representative pixel value input terminal G2. The composite pixel value calculation circuit further receives the data of the average deviation calculated by the average deviation calculation circuit 43 through the pixel value distribution identification information input terminal G3.

As understood from FIG. 4, the pixel value distribution correction circuit 52 receives target pixel value data P11 through the first input terminal. The pixel value distribution correction circuit 52 also receives the data of the average deviation through the second input terminal.

Figure 8:
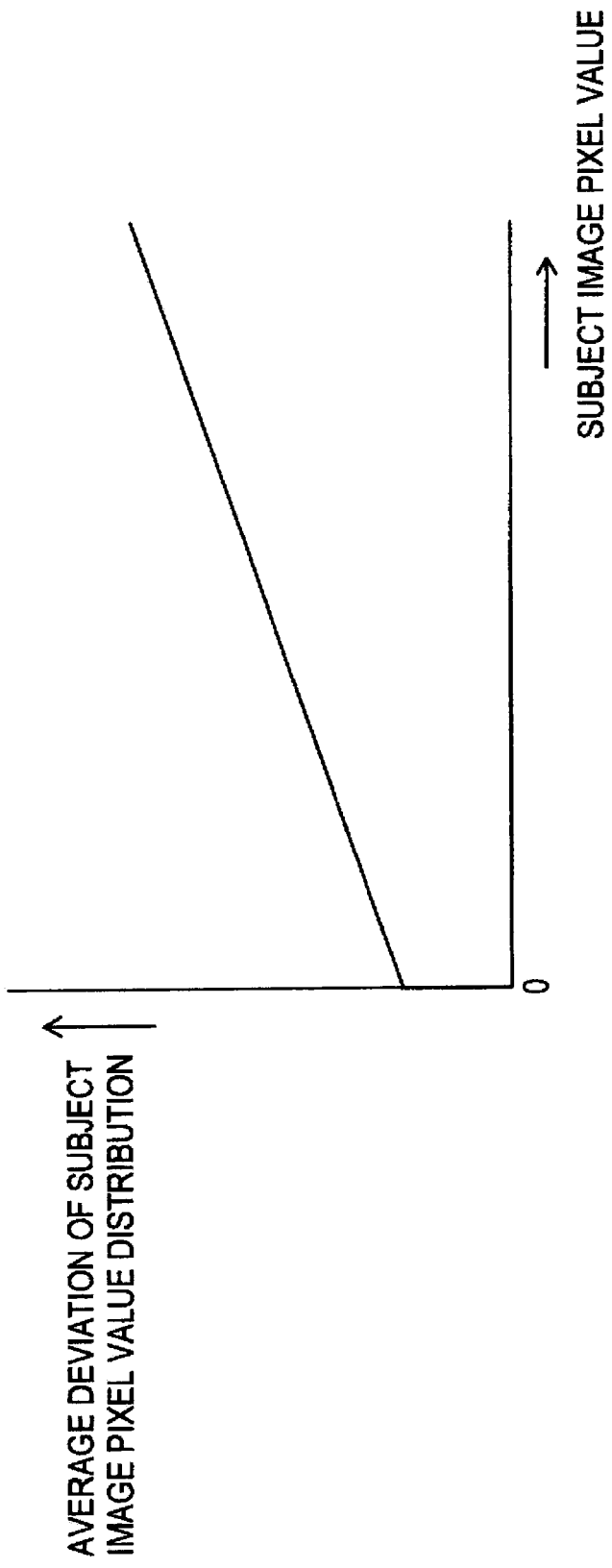
FIG. 8 is a graph showing the change of average deviation of subject image pixel value distribution to subject image pixel value.

As shown in FIG. 8, as the pixel value of the image of the subject becomes larger, the value of the average deviation of distribution of pixel values of the image of the subject also becomes larger. In the pixel value distribution correction circuit 52, the correction value of the average deviation corresponding to the pixel value of the image of the subject is stored as a look-up table. In the embodiment, the pixel value distribution correction circuit 52 reads out a correction value of average deviation from the look-up table according to the value of the target pixel value data P11 output from the image memory 20. Next, the pixel value distribution correction circuit 52 subtracts the correction value of the average deviation from the value of the average deviation entered in the pixel value distribution correction circuit 52. Further, the pixel value distribution correction circuit 52 outputs the value of the average deviation after correction to the clip circuit 53. The value of the average deviation after correction is the value obtained by subtracting the correction value of the average deviation from the value of the average deviation entered in the pixel value distribution correction circuit 52.

The clip circuit 53 receives data of the average deviation after correction. The clip circuit 53 clips the value of the average deviation exceeding a prescribed upper limit, or the value of the average deviation lower than a prescribed lower limit, respectively. The value of the average deviation after the clipping process is set to settle within a range from the upper limit to the lower limit. The clip circuit 53 outputs the data of the average deviation after clipping process to the subtraction circuit 54.

The subtraction circuit 54 subtracts the lower limit value from the value of the average deviation after clipping process. The subtraction circuit 54 sends the value of the subtraction result to the division circuit 55. The division circuit 55 divides the value of the subtraction result entered in the division circuit 55 by the differential value of the upper limit and lower limit, and calculates the pixel value composition rate $\alpha$. The value of the pixel value composition rate $\alpha$ satisfies the relation of $0 \leq \alpha \leq 1$.

As described above, the pixel value composition rate $\alpha$ is calculated in the following formula. Hence, the pixel value composition rate $\alpha$ declines along with elevation of the upper limit value, and declines along with elevation of the lower limit value. The upper limit value and lower limit value are determined at proper values by an empirical rule: $\alpha$=(value of average deviation after clipping process−lower limit value)/(upper limit value−lower limit value).

The pixel value composition circuit 57 receives target pixel value data P11 through the first input terminal H1. In addition, the pixel value composition circuit 57 receives the average (the value of representative pixel value data) calculated by the representative pixel value calculation circuit 30 through the second input terminal H2. Further, the pixel value composition circuit 57 receives the value of the pixel value composition rate $\alpha$ through the third input terminal H3.

The pixel value composition circuit 57 calculates the composite pixel value using the following formula. The composite pixel value is the combined value of the value of the target pixel value data P11, and the average (the value of representative pixel value data) calculated by the representative pixel value calculation circuit 30. The ratio of combining the value of the target pixel value data P11 and the average (the value of representative pixel value data) may be changed according to the pixel value composition rate $\alpha$.

Composite pixel value=average calculated by representative pixel value calculation circuit 30×(1−$\alpha$)+value of target pixel value data $P11 \times \alpha$.

As mentioned above, the pixel value composition rate $\alpha$ is calculated on the basis of the value of the average deviation calculated by the pixel value distribution identification circuit 40. In the preferred embodiment, by the value of the average deviation calculated by the pixel value distribution identification circuit 40, the degree of deviation between the values of all pixel value data in the 3×3 region and the average value of all pixel value data is known. As the calculated value of the average deviation becomes larger, the values of surrounding pixel value data P00 to P22 (except P11) are not uniform.

Therefore, along with elevation of the value of the pixel value composition rate α calculated on the basis of the average deviation, the values of surrounding pixel value data P00 to P22 (except P11) are not uniform. When the values of surrounding pixel value data P00 to P22 (except P11) are not uniform, according to the formula for calculating the composite pixel value, the ratio of the values of target pixel value data P11 in the composite pixel value is higher than the ratio of the average value calculated by the representative pixel value calculation circuit 30 in the composite pixel value.

On the other hand, as the value of the average deviation becomes smaller, the values of surrounding pixel value data P00 to P22 (except P11) become uniform. Accordingly, along with decline of the value of the pixel value composition rate α calculated on the basis of the average deviation, the values of surrounding pixel value data P00 to P22 (except P11) become uniform. When the values of surrounding pixel value data P00 to P22 (except P11) are uniform, according to the above formula for calculating the composite pixel value, as compared with the ratio of the values of target pixel value data P11 in the composite pixel value, the ratio of the average value calculated by the representative pixel value calculation circuit 30 in the composite pixel value is higher. The pixel value composition circuit 57 outputs the composite pixel value to the ε filter 60.

The ε filter 60 receives the composite pixel value through the composite pixel value input terminal I1. The ε filter 60 also receives surrounding pixel value data P00 to P22 (except P11) through the surrounding pixel value input terminals I2 to I9.

As understood from FIG. 5, the pixel value determination circuit 61A receives the composite pixel value through the first input terminal. In addition, the pixel value determination circuit 61A also receives surrounding pixel value data P00 through the second input terminal.

Each of the pixel value determination circuits 61B to 61H receives the composite pixel values through each first input terminal. In addition, each of the pixel value determination circuits 61B to 61H also receives surrounding pixel value data P01 to P22 (except P11) through each second input terminal.

As understood from FIG. 6, the pixel value determination circuit 61A receives the composite pixel value through the composite pixel value input terminal K1 in the absolute value judgment circuit 62. The absolute value judgment circuit 62 also receives the surrounding pixel value data P00 through the surrounding pixel value input terminal K2.

The composite pixel value is also given to the first input of the selector 63. The surrounding pixel value data P00 is also given to the second input of the selector 63.

The absolute value judgment circuit 62 first subtracts the composite pixel value from the value of surrounding pixel value data P00. Then, the absolute value judgment circuit 62 compares the absolute value of the subtraction result with the noise judgment value ε. When the absolute value judgment circuit 62 judges that the absolute value is lower than the noise judgment value ε, a surrounding pixel value data selection signal S1 is given to the select signal input of the selector 63. The noise judgment value ε corresponds to the threshold. The noise judgment value ε means the pixel width allowed for the absolute value of the subtraction result.

The selector 63 receives the surrounding pixel value data selection signal S1, and selects the surrounding pixel value data P00. The selector 63 sends the surrounding pixel value data P00 to the input terminal J1 of the average value calculation circuit 65 (see FIG. 5).

On the other hand, when the absolute value judgment circuit 62 judges that the absolute value is larger than the noise judgment value ε, a composite pixel value data selection signal S2 is given to the select signal input of the selector 63. The selector 63 receives the composite pixel value selection signal S2, and selects the composite pixel value. The selector 63 sends the composite value pixel value data to the input terminal J1 of the average value calculation circuit 65.

The pixel value determination circuits 61B to 61H operate same as the pixel value determination circuit 61A, and each absolute value judgment circuit 62 subtracts the composite pixel value from the values of the surrounding pixel value data. P01 to P22 (except P11). Then, each absolute value judgment circuit 62 compares the absolute value of the subtraction result with the noise judgment value ε.

In the pixel value determination circuits 61B to 61H, same as in the pixel value determination circuit 61A, each absolute value judgment circuit 62 sends out a surrounding pixel value data selection signal S1, or a composite pixel value data selection signal S2 to the select signal input of each selector 63. In the pixel value determination circuits 61B to 61H, same as in the pixel value determination circuit 61A, each selector 63 sends out the surrounding pixel value data P01 to P22 (except P11) or the data of composite pixel value to the input terminals J2 to J8 of the average value calculation circuit 65, respectively.

The average value calculation circuit 65 calculates the average value of all values entered in each of the input terminals J1 to J8 (values of surrounding pixel value data, of composite pixel value data). The average value calculation circuit 65 sends out the data of the average value from the output terminal J11.

The average value calculation circuit 65 extracts a 3×3 region in the whole area of digital image of the subject, and calculates the average value. The ε filter 60 sends out the data of the average value calculated by the average value calculation circuit 65 sequentially from the output terminal I11. In the image processing apparatus 10A of the preferred embodiment, using the data of average value output by the ε filter 60, the digital image of the subject is restored.

In the embodiment, the pixel value distribution identification circuit 40 calculates the average deviation (flatness) indicating the degree of deviation between the values of all pixel value data in the 3×3 region of the digital image of the subject and the average value of all the pixel value data. Therefore, the pixel value distribution identification circuit 40 calculating the average deviation (flatness) corresponds to the flatness calculation unit.

In the embodiment, the composite pixel value calculation circuit 50 combines the value of target pixel value data P11, and the average value (value of representative pixel value data) obtained by subtracting the maximum value and minimum value of the surrounding pixel value data from the sum of four surrounding pixel value data, according to the ratio determined by the pixel value composition rate α, and thereby calculates the composite pixel value. Therefore, the composite pixel value calculation circuit 50 calculating the composite pixel value corresponds to the pixel value composition unit.

In the embodiment, the pixel value distribution correction circuit 52 reads out the correction value of the average deviation (flatness) from the look-up table, according to the target pixel value data P11 output from the image memory 20. The pixel value distribution correction circuit 52 then subtracts the correction value of the average deviation from the value of the average deviation, and calculates the value of average deviation after correction. Therefore, the pixel value distribution correction circuit for calculating the value of average deviation after correction corresponds to the flatness correction unit.

In the embodiment, the process of calculating the average deviation (flatness) indicating the degree of deviation between the values of all pixel value data in the 3×3 region of the digital image of the subject and the average value of all the pixel value data corresponds to the flatness calculating step.

In the embodiment, the process of combining the value of target pixel value data P11, and the average value (value of representative pixel value data) obtained by subtracting the maximum value and minimum value of the surrounding pixel value data from the sum of four surrounding pixel value data, according to the ratio determined by the pixel value composition rate α, and calculating the composite pixel value corresponds to the pixel value combining step.

<Effects of First Embodiment>

According to the image processing apparatus 10A and the image processing method of the embodiment, the composite pixel value calculation circuit 50 combines the value of target pixel value data P11 and the average value calculated by the representative pixel value calculation circuit 30, by using the pixel value composition rate α, calculated on the basis of the average deviation output by the average deviation calculation circuit 43 of the pixel value distribution identification circuit 40, and thereby calculates the composite pixel value. Therefore, according to the image processing apparatus 10A and the image processing method, since the composite pixel value is calculated by using the pixel value composition rate α, calculated on the basis of the average deviation of distribution of pixel values in the 3×3 region in the digital image, when calculating the composite pixel value, the composite pixel value can be changed according to the distribution of pixel values in the 3×3 region. Hence, in the image processing apparatus 10A and the image processing method, when the composite pixel value is changed according to the distribution of pixel values in the 3×3 region, even if the values of surrounding pixel value data P00 to P22 (except P11) change suddenly across the image boundary, the composite pixel value can be calculated according to the changes of values of surrounding pixel value data P00 to P22 (except P11). Therefore, in the image processing apparatus 10A and the image processing method, even if the values of surrounding pixel value data P00 to P22 (except P11) change suddenly across the image boundary portion, when the ratio of the average value to be combined with the composite pixel value is lowered by using the pixel value composition rate α, the ratio of combining the value largely different from the value of target pixel value data P11 (pixel value of surrounding pixel) with the composite pixel value can be decreased, and the composite pixel value can be brought closer to the true value of the target pixel value data P11.

Further, in the image processing apparatus 10A and the image processing method of the embodiment, even if the values of surrounding pixel value data P00 to P22 (except P11) positioned on the periphery of target pixel value data P11 change suddenly across the image boundary, the composite pixel value can be calculated according to changes of the values of surrounding pixel value data P00 to P22 (except P11). Hence, on the basis of the composite pixel value calculated on the basis of changes of the values of surrounding pixel value data P00 to P22 (except P11), the height of the digital image contrast can be adjusted, so that an image excellent in sharpness can be obtained.

According to the image processing apparatus 10A and the image processing method of the embodiment, each absolute value judgment circuit 62 of the ε filter 60 compares the absolute value of subtracting the composite pixel value respectively from the value of each of surrounding pixel value data P00 to P22 (except P11), with the noise judgment value ε. In the image processing apparatus 10A and the image processing method of the preferred embodiment, since the composite pixel value is calculated by using the pixel value composition rate α, calculated on the basis of the average deviation of distribution of pixel values in the 3×3 region in the digital image, the absolute value of the subtraction result can be set to a value corresponding to the changes of the values of surrounding pixel value data P00 to P22 (except P11) Therefore, in the image processing apparatus 10A and the image processing method, the ε filter 60 can compare the values according to changes of surrounding pixel value data P00 to P22 (except P11), with the noise judgment value ε. Accordingly, the result of filtering process on the basis of the result of comparison between the absolute value and the noise judgment value εcan be changed according to changes of the values of surrounding pixel value data P00 to P22 (except P11), and the height of the digital image contrast can be adjusted on the basis of the result of the filtering process.

According to the image processing apparatus 10A and the image processing method of the embodiment, the average deviation calculation circuit 43 of the pixel value distribution identification circuit 40 calculates the average deviation of all pixel value data in the 3×3 region in the digital image. By the image processing apparatus 10A and the image processing method, on the basis of the calculated value of the average deviation, the degree of deviation between the values of surrounding pixel value data P00 to P22 (except P11) and the average value of all the pixel value data in the 3×3 region can be evaluated.

According to the image processing apparatus 10A and the image processing method of the embodiment, by the pixel value composition rate α, calculated on the basis of the average deviation of all pixel values in the 3×3 region in the digital image, when the values of surrounding pixel value data P00 to P22 (except P11) are judged to be uniform, the pixel value composition circuit 57 of the composite pixel value calculation circuit 50 heightens the ratio of the average value calculated by the representative pixel value calculation circuit 30 in the composite pixel value, as compared with the ratio of the values of target pixel value data P11 in the composite pixel value. Hence, in the image processing apparatus 10A and the image processing method, even if noise mixes in the target pixel value data P11, and the value of the target pixel value data P11 is not uniform with the values of surrounding pixel value data P00 to P22 (except P11), the ratio of the target pixel value data P11 containing noise in the composite pixel value in the composite pixel value is smaller than the ratio of the average calculated by the representative pixel value calculation circuit 30 in the composite pixel value is small. Therefore, according to the image processing apparatus 10A and the image processing method, when the ratio of the target pixel value data P11 containing noise in the composite pixel value is smaller than the ratio of the average calculated by the representative pixel value calculation circuit 30 in the composite pixel value, mixing of noise in the composite pixel value can be suppressed.

On the other hand, according to the image processing apparatus 10A and the image processing method, by the value of the pixel value composition rate α, when the values of surrounding pixel value data P00 to P22 (except P11) are judged to be not uniform, the pixel value composition circuit 57 of the composite pixel value calculation circuit 50 heightens the ratio of the values of target pixel value data P11 in the composite pixel value, as compared with the ratio of the average value calculated by the representative pixel value calculation circuit 30 in the composite pixel value. Hence, in the image processing apparatus 10A and the image processing method, if the surrounding pixel value data P00 to P22 (except P11) are present near the image boundary portion, and the values of the surrounding pixel value data are not uniform, the ratio of the average value relating to the value of the surrounding pixel value data existing near the image boundary in the composite pixel value is smaller than that of the value of the target pixel value data P11 in the composite pixel value. Therefore, according to the image processing apparatus 10A and the image processing method, when the ratio of the average value relating to the value of the surrounding pixel value data existing near the image boundary portion becomes smaller than the ratio of the target pixel value data P11 in the composite pixel value, the composite pixel value is brought closer to the pixel value of the target pixel, and the composite pixel value is prevented from approaching the value of the surrounding pixel value data existing near the image boundary. Accordingly, due to the differential value of the composite pixel value and the value of the surrounding pixel value data existing near the image boundary portion, the pixel value can be changed suddenly across the image boundary, and the contrast of the digital image is enhanced, and an image excellent in sharpness can be obtained.

According to the image processing apparatus 10A and the image processing method of the embodiment, the pixel value distribution correction circuit 52 subtracts the correction value corresponding to the value of the target pixel value data P11, from the value of the average deviation entered in the pixel value distribution correction circuit 52, and calculates the average deviation after correction. Hence in the image processing apparatus 10A and the image processing method, the average deviation after correction is free from effects of changes of pixel value of the target pixel, and the characteristic of average deviation can be maintained.

In the image processing apparatus 10A of the embodiment, in the pixel value distribution correction circuit 52, the correction value of average deviation corresponding to the pixel value of the image of the subject is stored as a look-up table. In the image processing apparatus 10A, according to the value of target pixel value data P11, the correction value of the average deviation is read out from the look-up table, so that the correction value of the average deviation can be selected easily.

Second Embodiment

Figure 9:
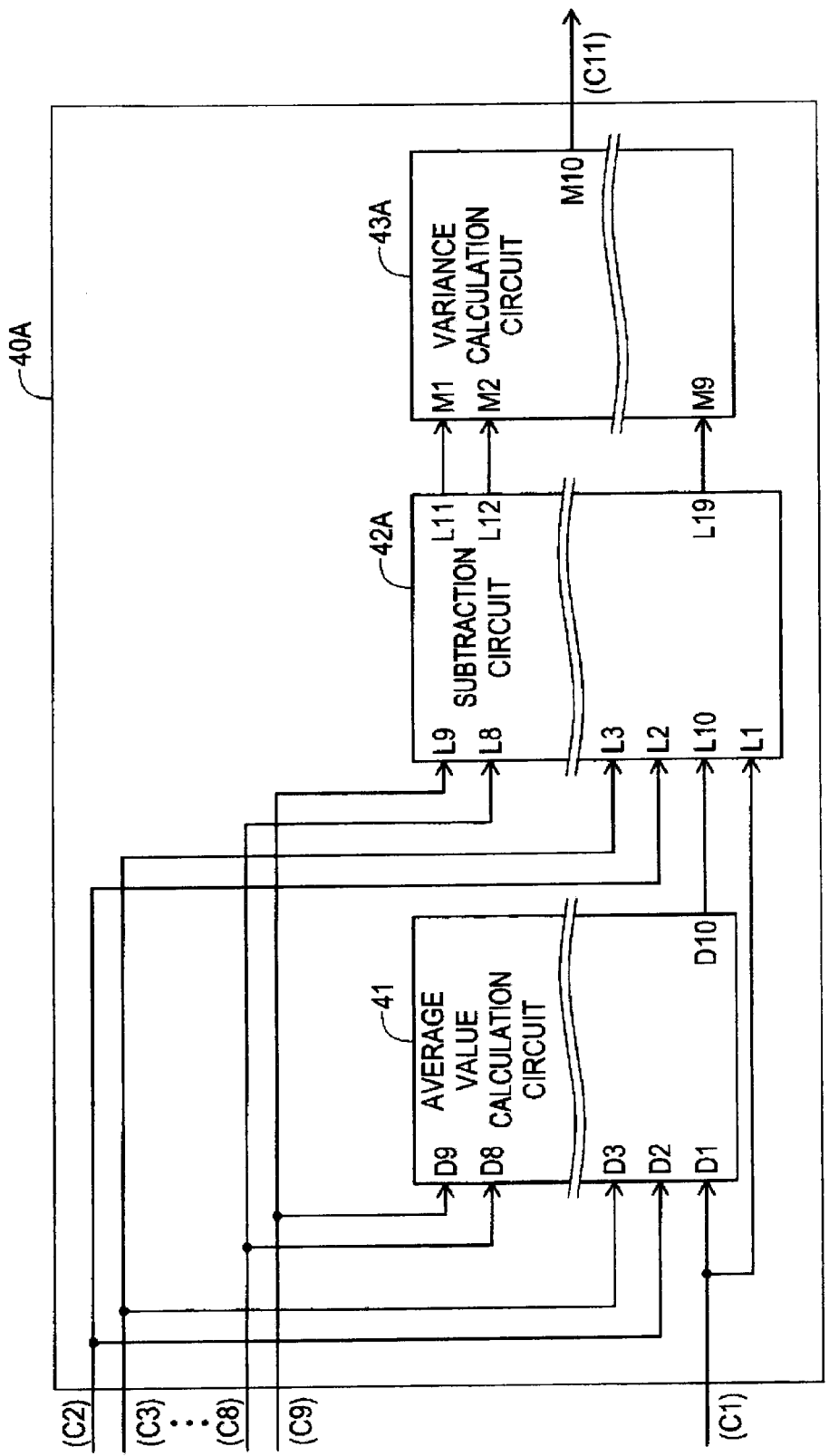
FIG. 9 is a schematic diagram of a pixel value distribution identification circuit provided for an image processing apparatus of the second embodiment.

A second embodiment of the disclosure is described below with reference to FIG. 9. Herein, same parts as in the first embodiment are identified with same reference numerals and repeated explanation is omitted. The image processing apparatus of the second embodiment is provided with a pixel value distribution identification circuit 40A shown in FIG. 9, instead of the pixel value distribution identification circuit 40 of the image processing apparatus 10A of the first embodiment. The pixel value distribution identification circuit 40A includes the average value calculation circuit 41, a subtraction circuit 42A, and a variance calculation circuit 43A.

A surrounding pixel value input terminal L2 of the subtraction circuit 42A is connected to a surrounding pixel value input terminal C2 of the pixel value distribution identification circuit 40A. Surrounding pixel value input terminals L3 to L9 of the subtraction circuit 42A are connected surrounding pixel value input terminals C3 to C9 of the pixel value distribution identification circuit 40A, respectively. An average value input terminal L10 of the subtraction circuit 42A is connected to an average value output terminal D10 of the average value calculation circuit 41. Surrounding pixel value input terminals L4 to L7 of the subtraction circuit 42A are not shown.

An input terminal M1 of the variance calculation circuit 43A is connected to an output terminal L11 of the subtraction circuit 42A. Input terminals M2 to M9 of the variance calculation circuit 43A are connected to output terminals L12 to L19 of the subtraction circuit 42A, respectively. Output terminals L13 to L18 of the subtraction circuit 41A and input terminals M3 to M8 of the variance calculation circuit 43A are not shown. An output terminal M10 of the variance calculation circuit 43A is connected to an output terminal C11 of the pixel value distribution identification circuit 40A.

The image processing method of the image processing apparatus of the second embodiment is explained below. Explanation of same image processing method as in the image processing apparatus 10A of the first embodiment is omitted. The subtraction circuit 42A receives the average value of all pixel value data in the 3×3 region through the average value input terminal L10. The subtraction circuit 42A further receives target pixel value data P11 through the target pixel value input terminal L1. The subtraction circuit 42A also receives surrounding pixel value data P00 to P22 (except P11) through the surrounding pixel value input terminals L2 to L9.

The subtraction circuit 42A calculates by subtracting the average value calculated by the average value calculation circuit 41 from the value of target pixel value data P11. The subtraction circuit 42A sends out the calculated subtraction result from the output terminal L11 to the input terminal M1 of the variance calculation circuit 43A.

The subtraction circuit 42A calculates a value by subtracting the average value calculated by the average value calculation circuit 41 from the value of surrounding pixel value data P00. The subtraction circuit 42A sends out the calculated subtraction result from the output terminal L12 to the input terminal M2 of the variance calculation circuit 43A.

The subtraction circuit 42A calculates values by subtracting the average value calculated by the average value calculation circuit 41 from each of the value of surrounding pixel value data P01 to P22 (except P11), respectively. The subtraction circuit 42A sends out the calculated subtraction result from the output terminals L13 to L19 to the input terminals M3 to M9 of the variance calculation circuit 43A.

The variance calculation circuit 43A receives, as described above, the result of subtracting the average value calculated by the average value calculation circuit 41 from the value of target pixel value data P11. The variance calculation circuit 43A further receives, as described above, the result of subtracting the average value calculated by the average value calculation circuit 41 from the value of the surrounding pixel value data P00 to P22 (except P11), respectively. The variance calculation circuit 43A calculates, first, the square sum of all the subtraction results entered in the input terminals M1 to M9. The variance calculation circuit 43 then calculates the variance by averaging the square sum. The variance calculation circuit 43 sends out the data of the calculated variance from the output terminal M10. The data of the variance is output from the output terminal C11 of the pixel value distribution identification circuit 40A. The variance corresponds to the flatness.

In the preferred embodiment, same as in the first embodiment, after correcting the variance by the pixel value distribution correction circuit 52, the pixel value composition rate α is calculated. Then, the pixel value composition circuit 57 calculates the composite pixel value in the same way as in the first embodiment. In this embodiment, the correction value of variance corresponding to the pixel value of the image of the subject is stored in the pixel value distribution correction circuit 52 as a look-up table.

<Effects of Second Embodiment>

According to the image processing apparatus and the image processing method of the second embodiment, the variance calculation circuit 43A of the pixel value distribution identification circuit 40 calculates the variance of all pixel value data in the 3×3 region in the digital image. According to the image processing apparatus and the image processing method of the second embodiment, therefore, on the basis of the calculated variance, the degree of variance of all surrounding pixel value data P00 to P22 (except P11) can be evaluated.

Third Embodiment

Figure 10:
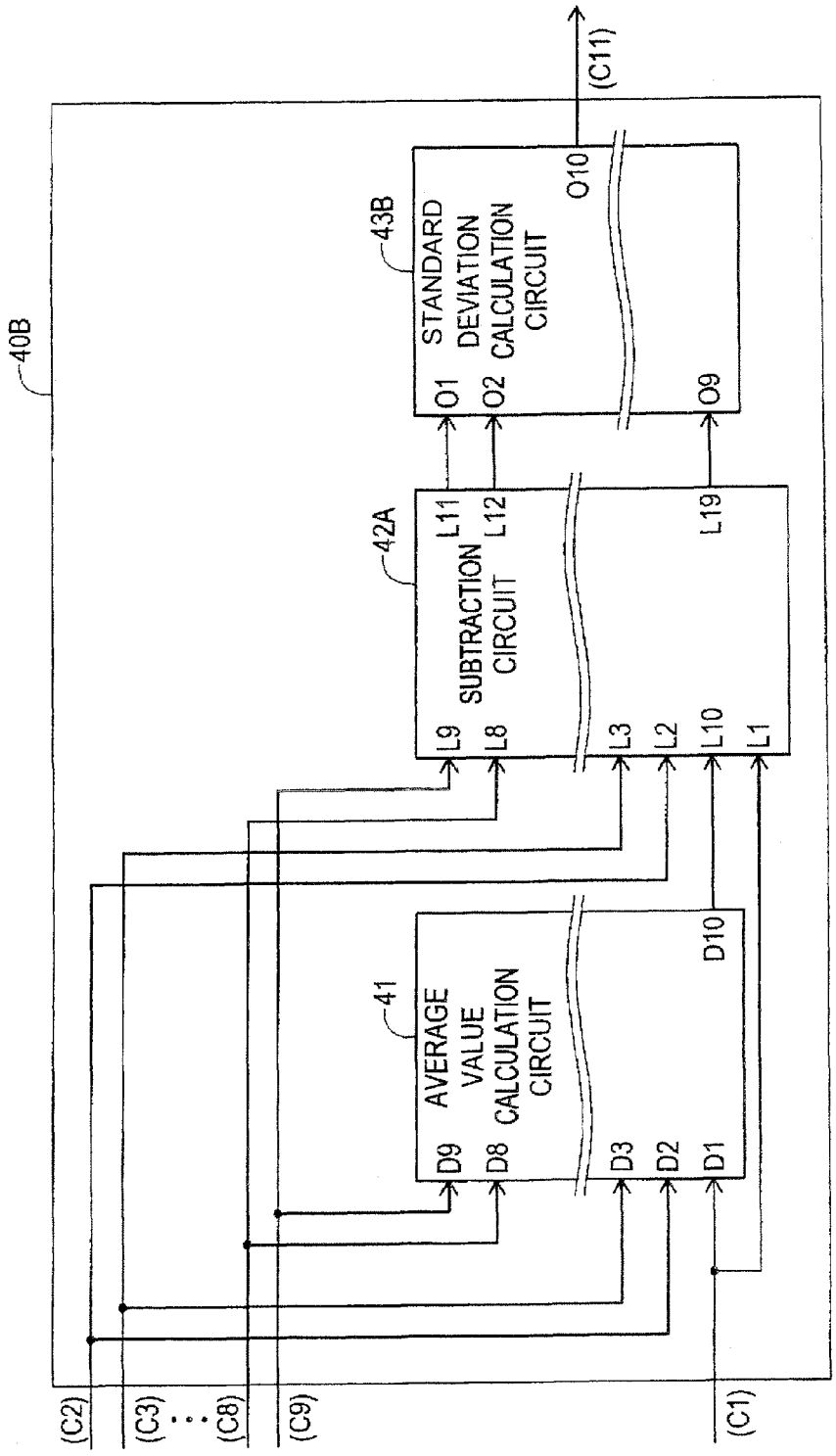
FIG. 10 is a schematic diagram of a pixel value distribution identification circuit provided for an image processing apparatus of the third embodiment.

A third embodiment of the disclosure is described below with reference to FIG. 10. Herein, same parts as in the first and second embodiments are identified with same reference numerals and repeated explanation is omitted. The image processing apparatus of the third embodiment is provided with a pixel value distribution identification circuit 40B shown in FIG. 10, instead of the pixel value distribution identification circuit 40 of the image processing apparatus 10A of the first embodiment. The pixel value distribution identification circuit 40B includes an standard deviation calculation circuit 43B, instead of the variance calculation circuit 43A of the pixel value distribution identification circuit 40A in the second embodiment.

An input terminal O1 of the standard deviation calculation circuit 43B is connected to the output terminal L11 of the subtraction circuit 42A. Input terminals O2 to O9 of the standard deviation calculation circuit 43B are connected to the output terminals L12 to L19 of the subtraction circuit 42A. Herein, the input terminals O3 to O8 of the standard deviation calculation circuit 43B are not shown. An output terminal O10 of the standard deviation calculation circuit 43B is connected to the output terminal C11 of the pixel value distribution identification circuit 40B.

The image processing method of the image processing apparatus of the third embodiment is explained below. The subtraction circuit 42A sends out the result of subtracting the average value calculated by the average value calculation circuit 41 from the value of target pixel value data P11 to the input terminal O1 of the standard deviation calculation circuit 43B from its output terminal L11.

The subtraction circuit 42A sends out the result of subtracting the average value calculated by the average value calculation circuit 41 from the value of surrounding pixel value data P00 to the input terminal O2 of the standard deviation calculation circuit 43B from its output terminal L12.

The subtraction circuit 42A calculates values by subtracting the average value calculated by the average value calculation circuit 41 from the value of surrounding pixel value data P01 to P22 (except P11), respectively. The subtraction circuit 42A sends out the calculated subtraction result to the input terminals O3 to O9 of the standard deviation calculation circuit 43B from its output terminals L13 to L19, respectively.

The standard deviation calculation circuit 43B receives, as described above, the result of subtracting the average value calculated by the average value calculation circuit 41 from the value of target pixel value data P11. The standard deviation calculation circuit 43B further receives, as described above, the result of subtracting the average value calculated by the average value calculation circuit 41 from the value of each of surrounding pixel value data P00 to P22 (except P11). The standard deviation calculation circuit 43B calculates, first, the square sum of all the subtraction results entered in the input terminals O1 to O9. The standard deviation calculation circuit 43B then divides the square sum by 8 (the total number of pieces of pixel value data−1) Then the standard deviation calculation circuit 43B calculates the square root of the result of the division to obtain the standard deviation. The standard deviation calculation circuit 43B sends out the calculated data of the standard deviation from its output terminal O10. The data of the standard deviation is sent out from the output terminal C11 of the pixel value distribution identification circuit 40B. The standard deviation corresponds to the flatness.

In the embodiment, same as in the first embodiment and the second embodiment, after correcting the standard deviation by the pixel value distribution correction circuit 52, the pixel value composition rate α is calculated. Then, the pixel value composition circuit 57 calculates the composite pixel value same as in the first embodiment and the second embodiment. In this embodiment, the correction value of standard deviation corresponding to the pixel value of the image of the subject is stored in the pixel value distribution correction circuit 52 as a look-up table.

<Effects of Third Embodiment>

According to the image processing apparatus and the image processing method of the third embodiment, the standard deviation calculation circuit 43B of the pixel value distribution identification circuit 40 calculates the standard deviation of all pixel value data in the 3×3 region in the digital image. According to the image processing apparatus and the image processing method of the third embodiment, therefore, on the basis of the calculated standard deviation, it is possible to evaluate whether or not the value of surrounding pixel value data P00 to P22 (except P11) is close to the average value of all the pixel value data in the 3×3 region.

Fourth Embodiment

Figure 11:
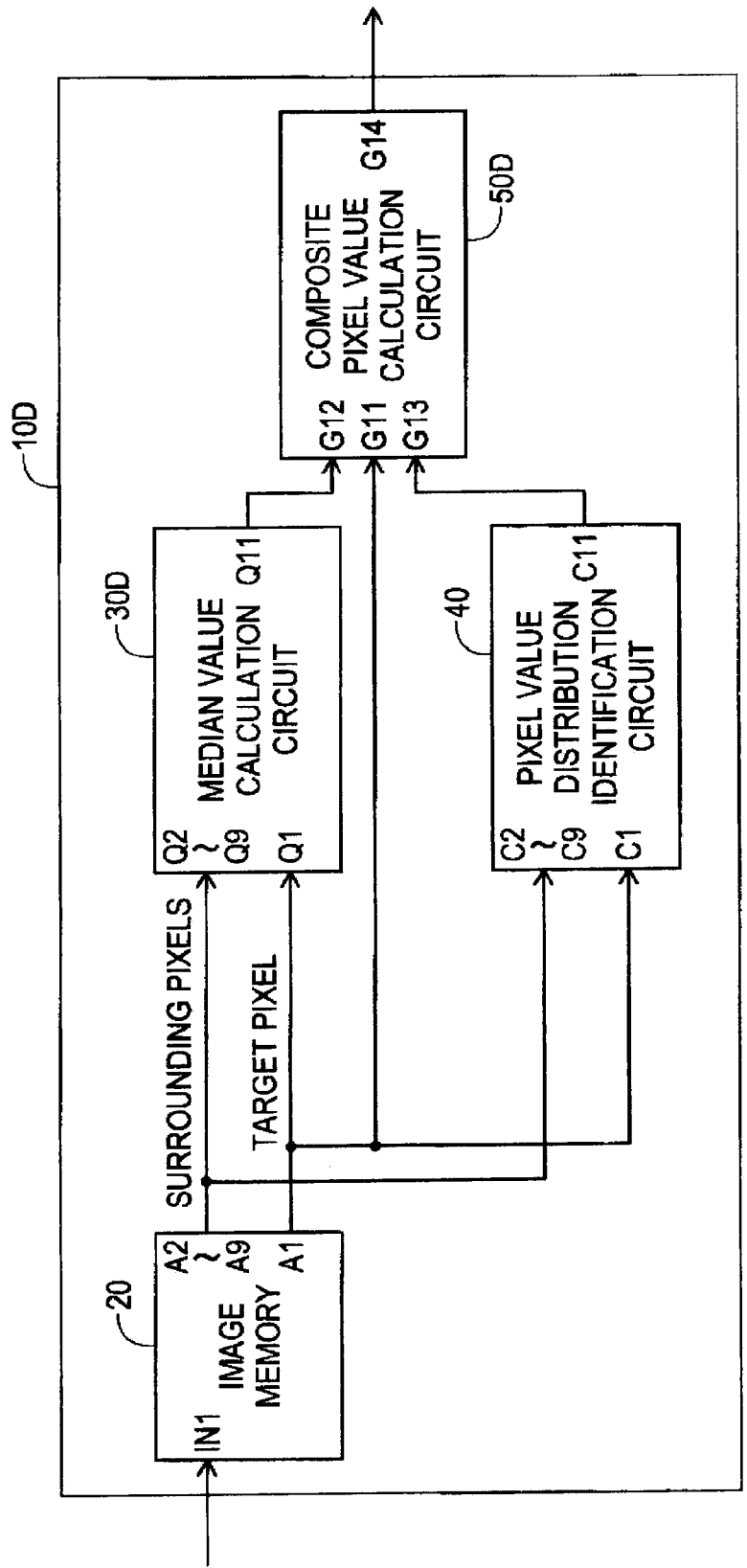
FIG. 11 is a schematic diagram of an image processing apparatus of the fourth embodiment.

A fourth embodiment of the disclosure is described below with reference to FIG. 11. Herein, same parts as in the first embodiment are identified with same reference numerals and repeated explanation is omitted. The image processing apparatus 10D of the fourth embodiment is provided with an image memory 20, a median value calculation circuit 30D, a pixel value distribution identification circuit 40, and a composite pixel value calculation circuit 50D.

The median value calculation circuit 30D is composed of a median filter. A target pixel value input terminal Q1 of the median value calculation circuit 30D is connected to a target pixel value output terminal A1 of the image memory 20. Surrounding pixel value input terminals Q2 to Q9 of the median value calculation circuit 30D are connected to surrounding pixel value output terminals A2 to A9 of the image memory 20, respectively. In the diagram, reference numeral Q11 is an output terminal of the median value calculation circuit 30D.

A target pixel value input terminal G11 of the composite pixel value calculation circuit 50D is connected to a target pixel value output terminal A1 of the image memory 20. A median value input terminal G12 of the composite pixel value calculation circuit 50D is connected to a median value output terminal Q11 of the median value calculation circuit 30D. A pixel value distribution identification information input terminal G13 of the composite pixel value calculation circuit 50D is connected to an output terminal C11 of the pixel value distribution identification circuit 40. In the diagram, reference numeral G14 is an output terminal of the composite pixel value calculation circuit 50D. The composite pixel value calculation circuit 50D is same in configuration as the composite pixel value calculation circuit 50 of the first embodiment, except that the terminals G1 to G4 of the composite pixel value calculation circuit 50 in the first embodiment are replaced by the terminals G11 to G14, respectively.

The image processing method of the image processing apparatus of the fourth embodiment is explained below. The image memory 20 is controlled by the CPU, and the target pixel value output terminal A1 sends out the target pixel value data P11 to the target pixel value input terminal Q1 of the median value calculation circuit 30D. In addition, the image memory 20 is controlled by the CPU, and the surrounding pixel value output terminals A2 to A9 send out the surrounding pixel value data P00 to P22 (except P11) to the surrounding pixel value input terminals Q2 to Q9 of the median value calculation circuit 30D, respectively.

As mentioned above, the median value calculation circuit 30D receives target pixel value data P11 through the target pixel value input terminal Q1. In addition, the median value calculation circuit 30D receives surrounding pixel value data P00 to P22 (except P11) through the surrounding pixel value input terminals Q2 to Q9, respectively. The median value calculation circuit 30D arranges all the entered surrounding pixel values sequentially from the higher values.

Further, the median value calculation circuit 30D determines the median value (the middle value) of the sequence of all the surrounding pixel values in the 3×3 region arranged from the higher values, as the representative pixel value of the 3×3 region. The median value (the middle value) is determined as a representative pixel value for reducing the noise mixing into the digital image. In succession, the median value calculation circuit 30D outputs the median value data from its output terminal Q11.

The composite pixel value calculation circuit 50D receives target pixel value data P11 through the target pixel value input terminal G11. In addition, the composite pixel value calculation circuit 50D receives the median value data through the median value input terminal G12. The composite pixel value calculation circuit 50D also receives data of average deviation through the pixel value distribution identification information input terminal G13.

In the pixel value composition circuit 57 of the composite pixel value calculation circuit 50D, the composite pixel value is calculated using the following formula. In the formula, α is the pixel value composition rate.

Composite pixel value=median value calculated by median value calculation circuit $30D \times (1-\alpha) +$ value of target pixel value data $P11 \times \alpha$ The composite pixel value calculation circuit 50D extracts a 3×3 region in the whole area of the digital image of the subject, and calculates the composite pixel value. The composite pixel value calculation circuit 50D sends out the calculated data of composite pixel values sequentially from its output terminal G14. In the image processing apparatus 10D of the embodiment, using the data of composite pixel values output from the composite pixel value calculation circuit 50D, the digital image of the subject is restored.

In the preferred embodiment, the median value calculation circuit 30D determines the median value of the surrounding pixel values as the representative pixel value in the 3×3 region of the digital image of the subject. Therefore, the median value calculation circuit 30D determining the median value (the representative pixel value) corresponds to the representative pixel value calculation unit.

<Effects of Fourth Embodiment>

According to the image processing apparatus 10D and the image processing method of the fourth embodiment, the median value calculation circuit 30D calculates the median value of all surrounding pixel values in the 3×3 region, as the representative pixel value of the 3×3 region of the digital image of the subject. According to the image processing apparatus 10D and the image processing method of the fourth embodiment, therefore, even if noise mixes in any one of the surrounding pixel values in the 3×3 region, and surrounding pixel value data P00 to P22 (except P11) are not uniform, since the median value of pixel values including the value of surrounding pixel value data containing noise is calculated, the calculated median value is suppressed in noise effects as compared with the value of surrounding pixel value data containing noise.

The disclosure is not limited to the foregoing illustrated embodiments alone, but may be changed and modified variously within the scope of the true spirit of the disclosure. For example, in the composite pixel value calculation circuits 50, 50D of the embodiments described above, the preset upper limit value of the clip circuit 53 is set to the sum of the preset lower limit value and the value of 2 to the N-th power, and the division circuit 55 may be composed of N-bit shifter. In the composite pixel value calculation circuits 50, 50D of each preferred embodiments, by forming each division circuit 55 by an N-bit shifter having a simple structure, the scale of each division circuit 55 may be reduced. Further, by forming each division circuit 55 by N-bit shifter having a simple structure, each division circuit 55 does not operate complicated process, and the time of the division process may be shortened.

Figure 12:
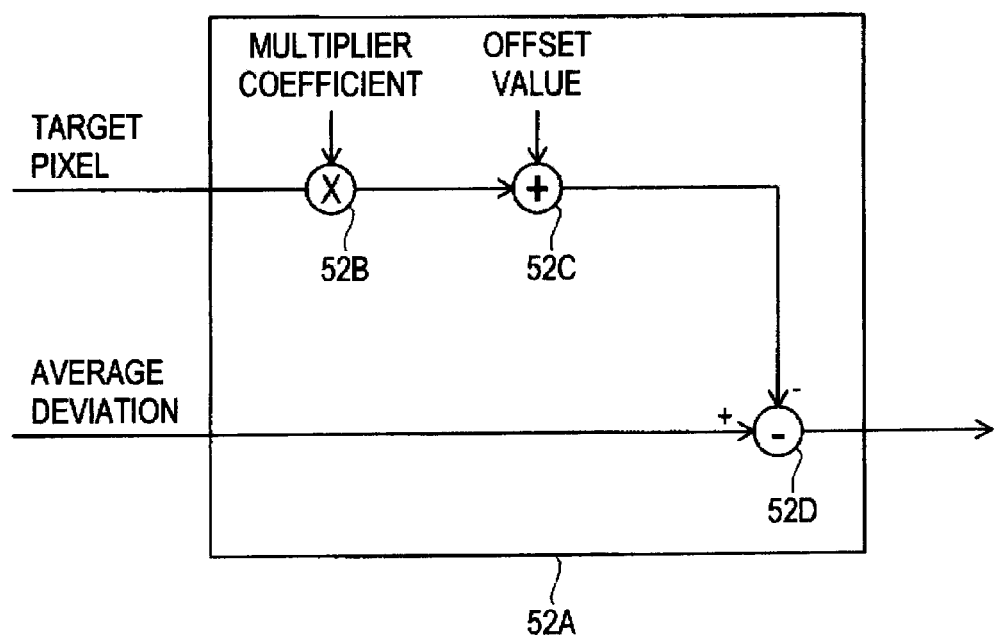
FIG. 12 is a schematic diagram of pixel value distribution correction circuit of another embodiment.

Instead of the pixel value distribution correction circuit 52 in the embodiments, a pixel value distribution correction circuit 52A shown in FIG. 12 may be used in the image processing apparatus of each embodiment. In the pixel value distribution correction circuit 52A, the inclination of the linear change (see FIG. 8) of the average deviation of distribution of pixel values of the subject image with respect to the pixel values of the subject image is defined as the multiplication coefficient, and the value of the average deviation, when the pixel value of the subject image in FIG. 8 is zero, is called the offset value.

In the pixel value distribution correction circuit 52A, the value of the target pixel value data P11 and the multiplication coefficient are multiplied by a multiplier 52B. In an adder 52C, the value of multiplication result by the multiplier 52B and the offset value are added. In a subtractor 52D, the value (correction value) of the summed result of the adder 52C is subtracted from the value of the average deviation. The subtractor 52D outputs the value of the subtraction result as the value of average deviation after correction.

In the pixel value distribution correction circuit 52A shown in FIG. 12, by using the multiplication coefficient and the offset value reflecting the linear change of average deviation of distribution of pixel values of the subject image with respect to the target pixel value data P11, the correction value for subtracting from the value of average deviation is calculated. Herein, in the pixel value distribution correction circuit 52A, corresponding to the target pixel value data P11, by changing the multiplication coefficient and the offset value, the correction value can be calculated individually corresponding to the target pixel value data P11. Hence, in the pixel value distribution correction circuit 52A, the correction value can be set to an appropriate value corresponding to the target pixel value data P11.

Unlike the first embodiment to the third embodiment, the representative pixel value calculation circuit may calculate the average value of two surrounding pixel values adjacent to the target pixel value data P11 as the representative pixel value in the 3×3 region, or may calculate the median value of a proper number of surrounding pixel values. In addition, unlike the first embodiment to the third embodiment, the representative pixel value calculation circuit may handle the pixel values in 4×4 region, 5×5 region or other in the digital image.

Unlike the first embodiment to the third embodiment, instead of forming pixel value distribution correction circuit 52 in the normalizing circuit of the composite pixel value calculation circuit, the data of average deviation calculated by the pixel value distribution identification circuit 40 may be put into the clip circuit 53 of the normalizing circuit.

Figure 13:
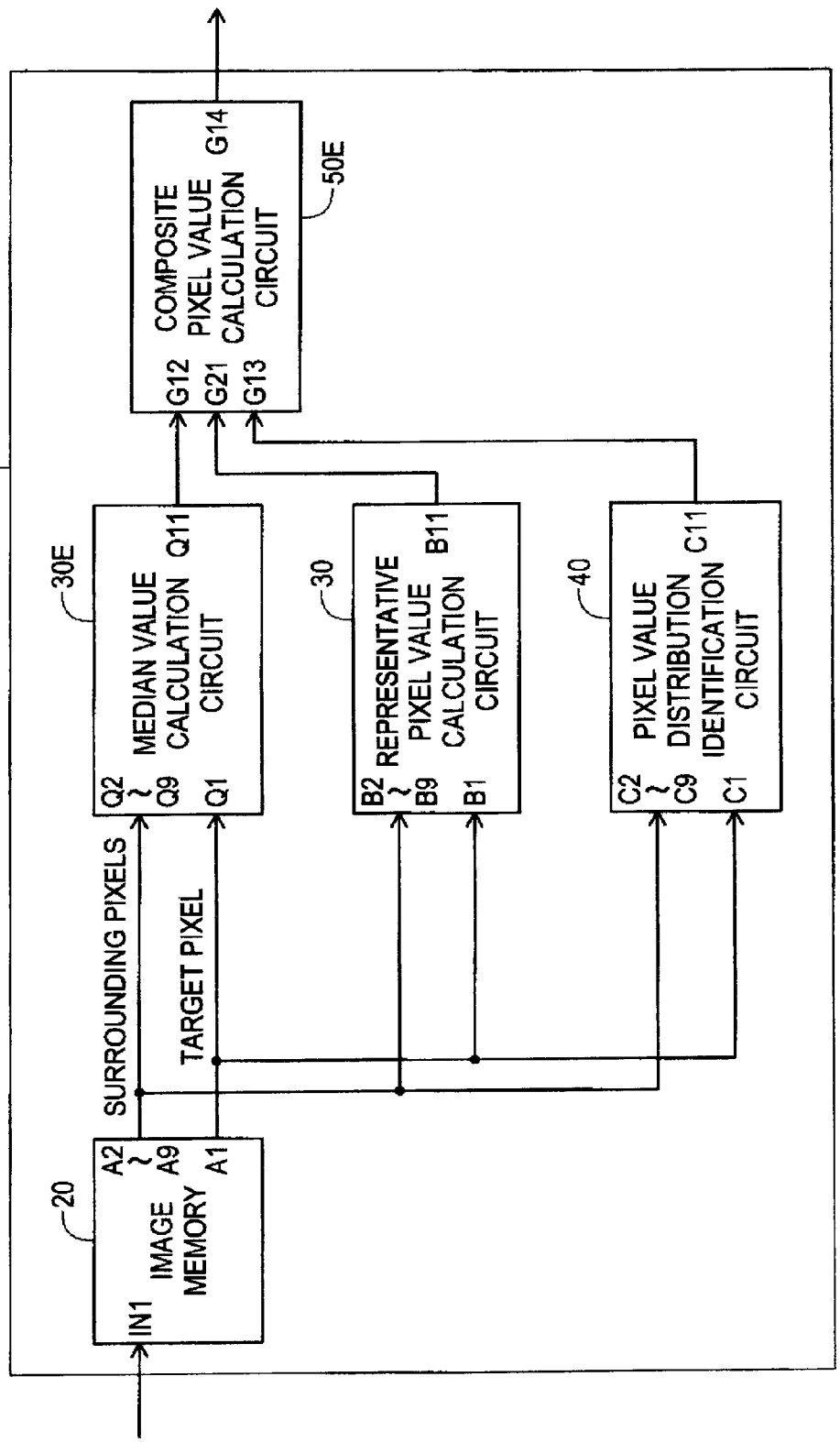
FIG. 13 is a schematic diagram of an image processing apparatus of still another embodiment.
Figure 14:
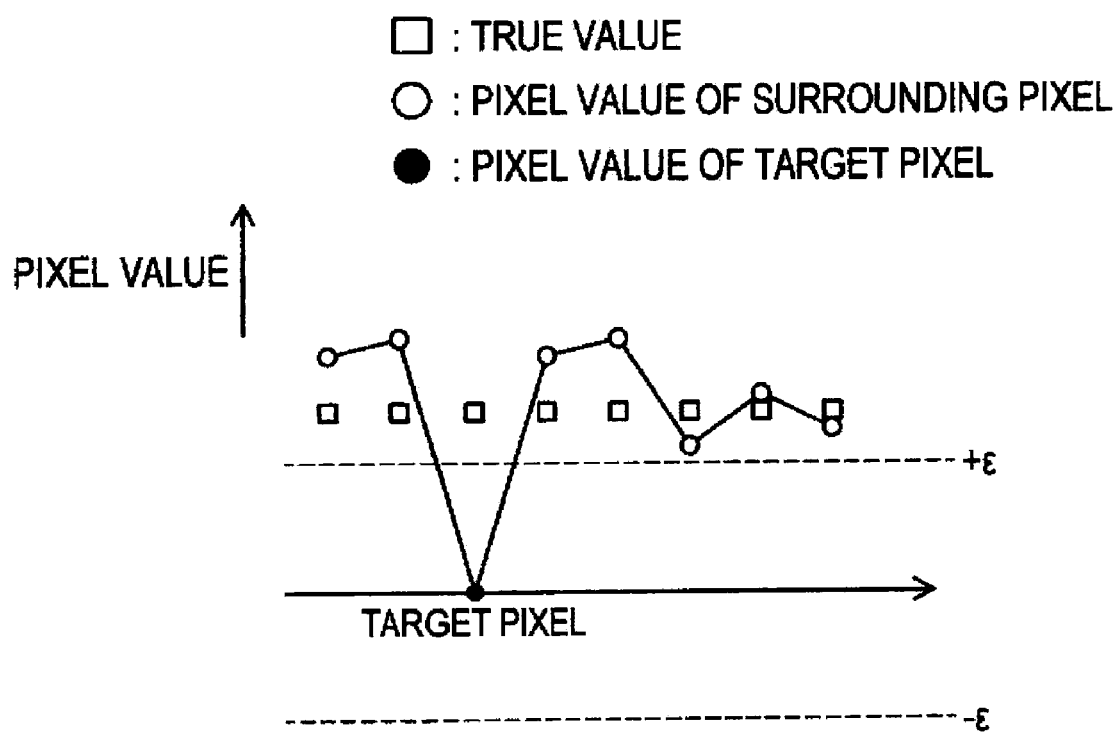
FIG. 14 is a pixel value distribution chart showing noise incorporation in a target pixel.
Figure 15:
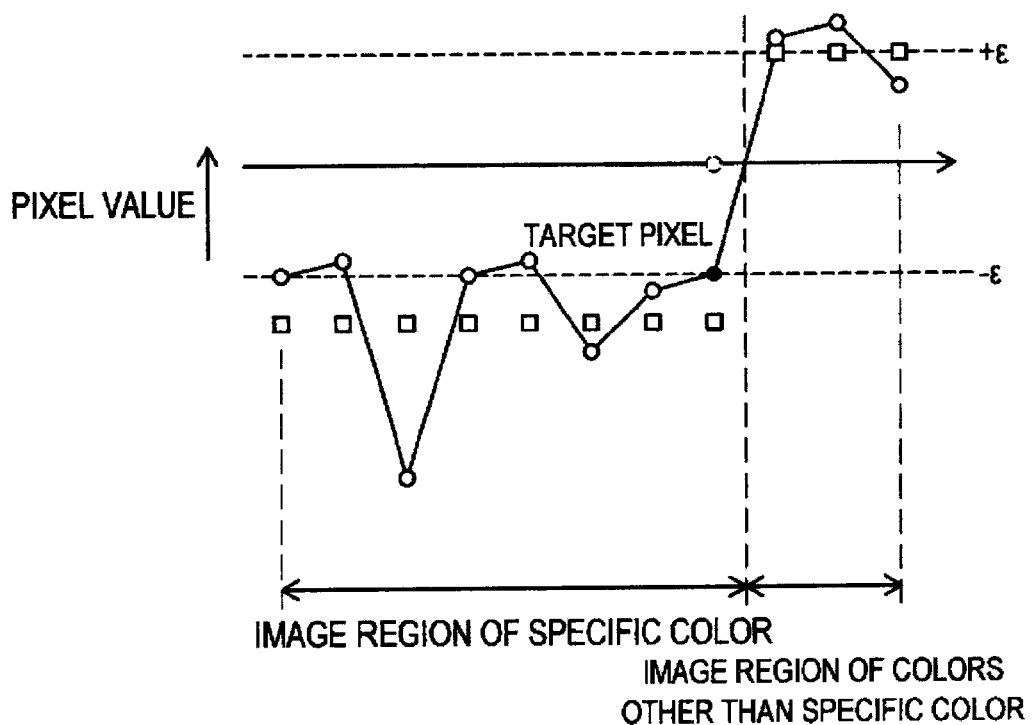
FIG. 15 is a pixel value distribution chart showing the existence of a target pixel near an image boundary.

As shown in FIG. 13, the image processing apparatus 10E may be provided with the median value calculation circuit 30E and the representative pixel value calculation circuit 30 (see the first embodiment). Herein, the median value calculation circuit 30E calculates the median value of all the pixel values in the 5×5 region in the digital image, and the representative pixel value calculation circuit 30A calculates the representative pixel value of all the pixel values in the 3×3 region in the digital image.

In the image processing apparatus 10E, the composite pixel value calculation circuit 50E calculates the composite pixel value in the following formula. In the formula, α is the pixel value composition rate.

> Composite pixel value=median value calculated by median value calculation circuit 30*E*×(1−α)+ representative pixel value calculated by representative pixel value calculation circuit 30*A*×α.

In the image processing apparatus 10E, since the values of surrounding pixel value data P00 to P22 (except P11) in the 3×3 region are not uniform, if the value of the pixel value composite rate α is raised, as understood from the above formula, the ratio of the representative pixel values in the composite pixel values is set higher than the ratio of median values in composite pixel values. Accordingly, in the image processing apparatus 10E, if the values of surrounding pixel value data P00 to P22 (except P11) in the 3×3 region are not uniform, the object pixel region (3×3 region) reflecting the composite pixel value is set narrower than the object pixel region (5×5 region) handled by the median value calculation circuit 30E. As a result, in the image processing apparatus 10E, reflection of non-uniform pixel values in the composite pixel values can be suppressed, and it is effective to prevent elevation of differential value between the composite pixel values and target pixel values.

On the other hand, in the image processing apparatus 10E, since the values of surrounding pixel value data P00 to P22 (except P11) in the 3×3 region are uniform, if the value of the pixel value composite rate α is lowered, as understood from the formula, the ratio of median values in composite pixel values is set higher than the ratio of the representative pixel values in the composite pixel values. Accordingly, in the image processing apparatus 10E, if the values of surrounding pixel value data P00 to P22 (except P11) in the 3×3 region are uniform, the object pixel region (5×5 region) reflecting the composite pixel values is set wider than the object pixel region (3×3 region) handled by the representative pixel value calculation circuit 30. As a result, in the image processing apparatus 10E, as compared with the case in which the values of surrounding pixel value data P00 to P22 (except P11) in the 3×3 region are not uniform, the rate of reflecting uniform pixel values to the composite pixel values can be heightened, and the composite pixel values are brought closer to the pixel value of the target pixel.

The median value calculation circuits 30D, 30E of the image processing apparatus 10D of the fourth embodiment and the image processing apparatus 10E shown in FIG. 13 may be replaced by the space filter having a weight table to compose the image processing apparatus.

The disclosure is not limited to these embodiments alone, but may be applied in filter processing between pixels of same color, concerning the image sensor of Bayer or the like.

According to the image processing filter, the image processing method of image processing filter, and the image processing circuit of the image processing apparatus having the image processing filter of the disclosure, on the basis of blend ratio corresponding to the flatness of distribution of pixel values of surrounding pixels positioned on the periphery of target pixel to be filtered, the pixel value of target pixel and pixel values of surrounding pixels positioned on the periphery of target pixel are blended, and a composite pixel value is produced from the pixel value of target pixel and the pixel value of surrounding pixel. Hence, in the image processing filter, the image processing method of image processing filter, and the image processing circuit of the image processing apparatus having the image processing filter of the disclosure, since the composite pixel value is produced on the basis of blend ratio corresponding to the flatness of distribution of pixel values of surrounding pixels, when generating the composite pixel value, the composite pixel value can be changed according to the distribution state of pixel values of surrounding pixels. In the image processing filter, the image processing method of image processing filter, and the image processing circuit of the image processing apparatus having the image processing filter of the disclosure, therefore, when the composite pixel value is changed according to the distribution state of pixel values of surrounding pixels, even if the pixel values of surrounding pixels change suddenly across the image boundary portion, the composite pixel value can be produced according to the change of pixel values of the surrounding pixels. Therefore, in the image processing filter, the image processing method of image processing filter, and the image processing circuit of the image processing apparatus having the image processing filter of the disclosure, even if the pixel values of surrounding pixels positioned on the periphery of target pixel change suddenly across the image boundary portion, by lowering the ratio of pixel values of surrounding pixels to be blended to the composite pixel value corresponding to the flatness, the ratio of blending pixel values largely different from the pixel value of target pixel (pixel values of surrounding pixels) to the composite pixel value can be decreased, and the composite pixel value may be brought closer to the true value of the pixel value of target pixel.

Further, according to the image processing filter, the image processing method of image processing filter, and the image processing circuit of the image processing apparatus having the image processing filter of the disclosure, even if the pixel values of surrounding pixels positioned on the periphery of target pixel change suddenly across the image boundary portion, the composite pixel value can be produced according to changes of pixel values of surrounding pixels, and hence the height of the image contrast can be adjusted according to the composite pixel value, so that an image excellent in sharpness can be obtained.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing filter configured to correct a pixel value of an image, comprising:
a flatness calculation unit configured to calculate a flatness of distribution of pixel values of surrounding pixels positioned on a periphery of a target pixel to be filtered, and
a pixel value composition unit configured to blend the pixel value of the target pixel and a representative pixel value of the surrounding pixels, based on a blend ratio having a positive correlation with the flatness calculated by the flatness calculation unit, so that a first rate is larger as the flatness is smaller, where the first rate is the rate of the value corresponding to the pixel value of a plurality of surrounding pixels positioned on the periphery of the target pixel, and to generate a composite pixel value by combining the pixel value of the target pixel and the representative pixel value of the surrounding pixels.

2. The image processing filter of claim 1, wherein the pixel value composition unit is configured to blend so that a second rate is larger as the flatness is greater, where the second rate is the rate of the value corresponding to the pixel value of the target pixel.

3. The image processing filter of claim 1, further comprising an $\epsilon$ filter configured to compare a differential value of the composite pixel value and the representative pixel value of the surrounding pixels with a threshold value.

4. The image processing filter of claim 1, wherein the flatness calculation unit calculates an average deviation, a variance or a standard deviation in distribution of pixel values of surrounding pixels as the flatness.

5. The image processing filter of claim 1, wherein the flatness calculation unit calculates a flatness of pixels in the number of power of 2, as the pixels of the plurality of surrounding pixels positioned on the periphery of the target pixel.

6. The image processing filter of claim 1, wherein the pixel value composition unit has a flatness correction unit configured to correct the flatness according to the pixel value of the target pixel.

7. The image processing filter of claim 6, wherein the pixel value composition unit has a memory storing the corresponding relation of the pixel value of the target pixel and correction value of the flatness.

8. The image processing filter of claim 6, wherein the pixel value composition unit calculates the correction value of the flatness by the relation formula representing the corresponding relation of the pixel value of the target pixel and correction value of the flatness.

9. An image processing circuit of an image processing apparatus comprising an image sensor configured to convert a subject image into image data, an image processing filter configured to eliminate noise included in the image data converted by the image sensor, and an image generation unit configured to generate an image based on the image data from which the noise is eliminated by the image processing filter,
wherein the image processing filter includes:
a flatness calculation unit configured to calculate a flatness of distribution of pixel values of surrounding pixels positioned on the periphery of a target pixel included in the image data of the subject image to be filtered, and
a pixel value composition unit configured to blend the pixel value of the target pixel and a representative pixel value of the surrounding pixels, based on a blend ratio having a positive correlation with the flatness calculated by the flatness calculation unit, so that a rate is larger as the flatness is smaller, wherein the rate is the rate of the value corresponding to the pixel value of a plurality of surrounding pixels positioned on the periphery of the target pixel, and to generate a composite pixel value by combining the pixel value of the target pixel and the representative pixel value of the surrounding pixels.

10. An image processing method of an image processing filter configured to correct the pixel value of an image comprising:
calculating a flatness of distribution of pixel values of surrounding pixels positioned on the periphery of target pixel to be filtered, and
blending the pixel value of the target pixel and a representative pixel value of the surrounding pixels, based on a blend ratio having a positive correlation with the flatness calculated at the calculating, so that a first rate is larger as the flatness is smaller, wherein the first rate is the rate of the value corresponding to the pixel value of a plurality of surrounding pixels positioned on the periphery of the target pixel, and generating a composite pixel value by combining the pixel value of the target pixel and the representative pixel value of the surrounding pixels.

11. The image processing method of an image processing filter of claim 10, further comprising comparing a differential value of the composite pixel value generated at the blending and the representative pixel value of the surrounding pixels with a threshold, by means of an $\epsilon$ filter.

12. The image processing method of an image processing filter of claim 10, wherein the calculating further includes calculating an average deviation, a variance or a standard deviation in distribution of pixel values of surrounding pixels as the flatness.

13. The image processing method of an image processing filter of claim 10, wherein the blending is to blend so that a second rate larger as the flatness is greater, where the second rate is the rate of the value corresponding to the pixel value of the target pixel.

14. The image processing method of an image processing filter of claim 10, wherein the blending further includes correcting the flatness according to the pixel value of the target pixel.

15. An image processing filter configured to correct a pixel value of an image, comprising:
a flatness calculation unit configured to calculate a flatness of distribution of pixel values of surrounding pixels positioned on a periphery of a target pixel to be filtered,
a pixel value composition unit configured to blend the pixel value of the target pixel and a representative pixel value of the surrounding pixels, based on a blend ratio having a positive correlation with the flatness calculated by the flatness calculation unit, and to generate a composite pixel value by combining the pixel value of the target pixel and the representative pixel value of the surrounding pixels, and
an $\epsilon$ filter configured to compare a differential value of the composite pixel value and the representative pixel value of the surrounding pixels with a threshold value.

16. An image processing method of an image processing filter configured to correct the pixel value of an image comprising:

calculating a flatness of distribution of pixel values of surrounding pixels positioned on the periphery of target pixel to be filtered, blending the pixel value of the target pixel and a representative pixel value of the surrounding pixels, based on a blend ratio having a positive correlation with the flatness calculated at the calculating, and generating a composite pixel value by combining the pixel value of the target pixel and the representative pixel value of the surrounding pixels, and comparing a differential value of the composite pixel value generated at the blending and the representative pixel value of the surrounding pixels with a threshold, by means of an $\epsilon$ filter.

* * * * *